(12) United States Patent
Kamada et al.

(10) Patent No.: US 7,995,109 B2
(45) Date of Patent: Aug. 9, 2011

(54) IMAGING APPARATUS THAT CAPTURES AN IMAGE OF A SUBJECT

(75) Inventors: Yasunori Kamada, Kanagawa (JP); Takayasu Kon, Tokyo (JP); Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 396 days.

(21) Appl. No.: 12/229,061

(22) Filed: Aug. 19, 2008

(65) Prior Publication Data

US 2009/0051785 A1     Feb. 26, 2009

(30) Foreign Application Priority Data

Aug. 23, 2007   (JP) ................................. 2007-216688

(51) Int. Cl.
 *H04N 5/228* (2006.01)
(52) U.S. Cl. .................................... 348/222.1
(58) Field of Classification Search ............... 348/222.1, 348/231.99, 231.2, 231.3, 113, 116, 207.99
See application file for complete search history.

(56) References Cited

U.S. PATENT DOCUMENTS

| | | | |
|---|---|---|---|
| 6,459,388 B1 * | 10/2002 | Baron | 340/996 |
| 7,742,083 B2 * | 6/2010 | Fredlund et al. | 348/231.2 |
| 2002/0039203 A1 | 4/2002 | Endo et al. | |
| 2004/0239776 A1 | 12/2004 | Shinohara et al. | |
| 2005/0122405 A1 * | 6/2005 | Voss et al. | 348/211.2 |
| 2006/0171694 A1 | 8/2006 | Kamimura et al. | |
| 2006/0197845 A1 | 9/2006 | Masaki | |
| 2009/0027513 A1 | 1/2009 | Sako | |
| 2009/0051785 A1 | 2/2009 | Kamada et al. | |

FOREIGN PATENT DOCUMENTS

| | | |
|---|---|---|
| CN | 1816111 A | 8/2006 |
| JP | 06-030374 A | 2/1994 |
| JP | 07-107351 A | 4/1995 |
| JP | 08-279954 A | 10/1996 |
| JP | 10-150598 A | 6/1998 |
| JP | 2002-022463 A | 1/2002 |
| JP | 2002-034030 | 1/2002 |

(Continued)

OTHER PUBLICATIONS

"Augmented Album: Situation-dependent System for a Personal Digital Video/Image Collection", Hewagamage et al., 2000 IEEE Int'l Conference on Multimedia Computing & Systems, New York, Jul. 30, 2000 to Aug. 2, 2000, vol. 1, pp. 323-326.

(Continued)

*Primary Examiner* — Nicholas G Giles
(74) *Attorney, Agent, or Firm* — Wolf, Greenfield & Sacks, P.C.

(57) ABSTRACT

An imaging apparatus includes an imaging unit configured to perform, as an image capturing operation, a process of obtaining captured image data of a subject and save the captured image data; a position detecting unit configured to detect current position information; and a control unit configured to update activity history information on the basis of the position information obtained by the position detecting unit and, when performing image capturing control as an automatic image capturing process not based on a shutter operation performed by a user, set an image capturing operation setting on the basis of the current position information detected by the position detecting unit and the activity history information, and cause the imaging unit to perform an image capturing operation based on the image capturing operation setting.

7 Claims, 16 Drawing Sheets

FOREIGN PATENT DOCUMENTS

| | | |
|---|---|---|
| JP | 2003-060972 A | 2/2003 |
| JP | 2004-212232 A | 7/2004 |
| JP | 2004-333921 A | 11/2004 |
| JP | 2005-276220 A | 10/2005 |
| JP | 2006-140695 A | 6/2006 |
| JP | 2006-251938 A | 9/2006 |
| JP | 2007-066251 | 3/2007 |
| JP | 2007-109049 A | 4/2007 |
| JP | 2007-123953 A | 5/2007 |
| JP | 2007-150993 A | 6/2007 |
| JP | 2007-172035 A | 7/2007 |
| JP | 2007-206099 A | 8/2007 |
| WO | WO 90/08371 A1 | 7/1990 |

OTHER PUBLICATIONS

"Smart Sight: A Tourist Assistant System", Yang et al., Proc $3^{rd}$ Int'l Syposium on Wearable Computers, 1999, pp. 73-78 (retreived on Oct. 30, 2008 from http://isl.ira.uka.de/fileadmin/publicationfiles/ISWC99-jie.pdf.

\* cited by examiner

FIG. 3A

|  | AREA | NUMBER OF VISITS |
|---|---|---|
| #1 | AR1 | 5 |
| #2 | AR2 | 1 |
| #3 | AR3 | 58 |
| ⋮ | ⋮ | ⋮ |

FIG. 3B

|  | POSITION INFORMATION (LATITUDE AND LONGITUDE) | NUMBER OF VISITS |
|---|---|---|
| #1 | P1 | 5 |
| #2 | P2 | 10 |
| #3 | P3 | 63 |
| ⋮ | ⋮ | ⋮ |

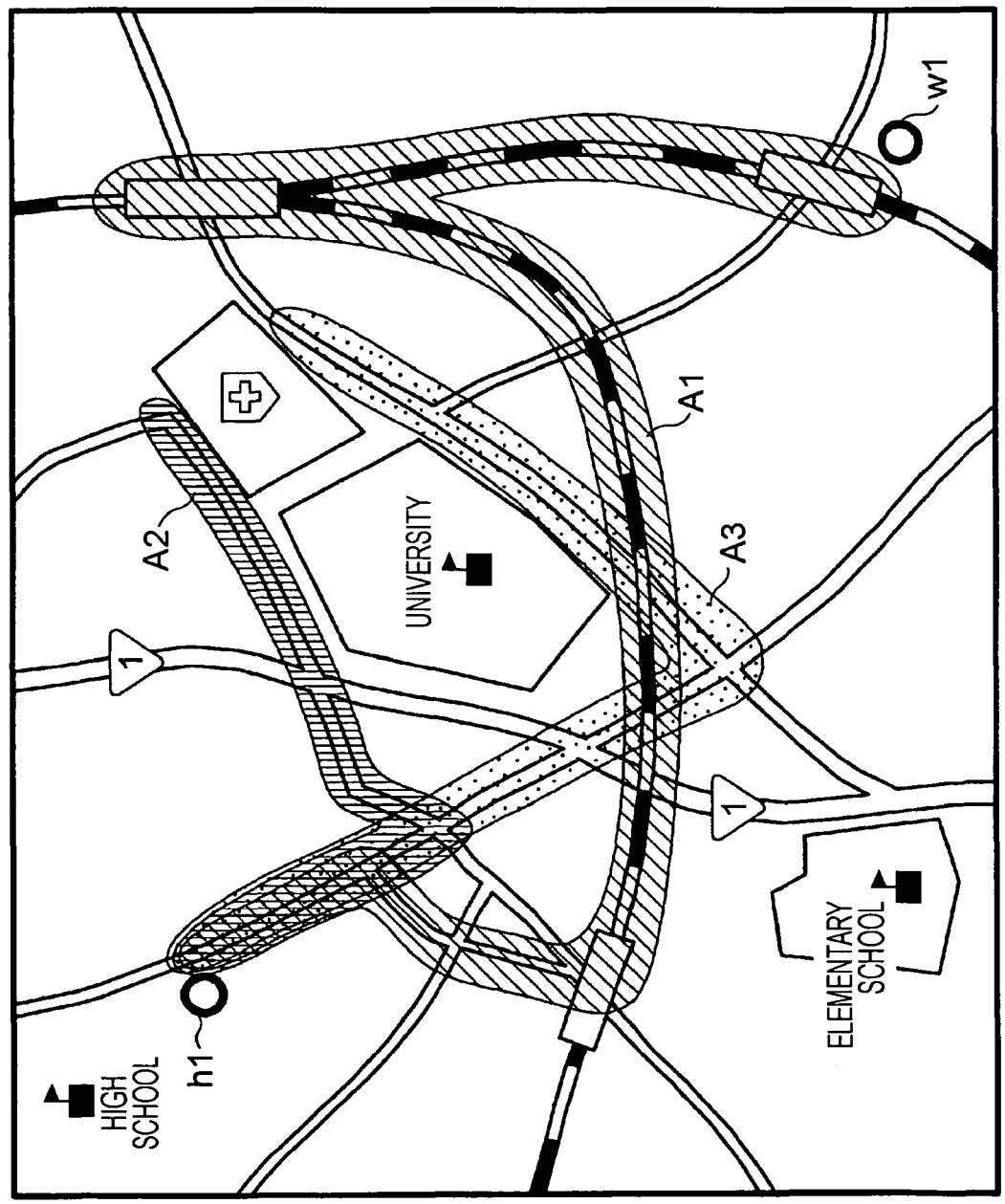

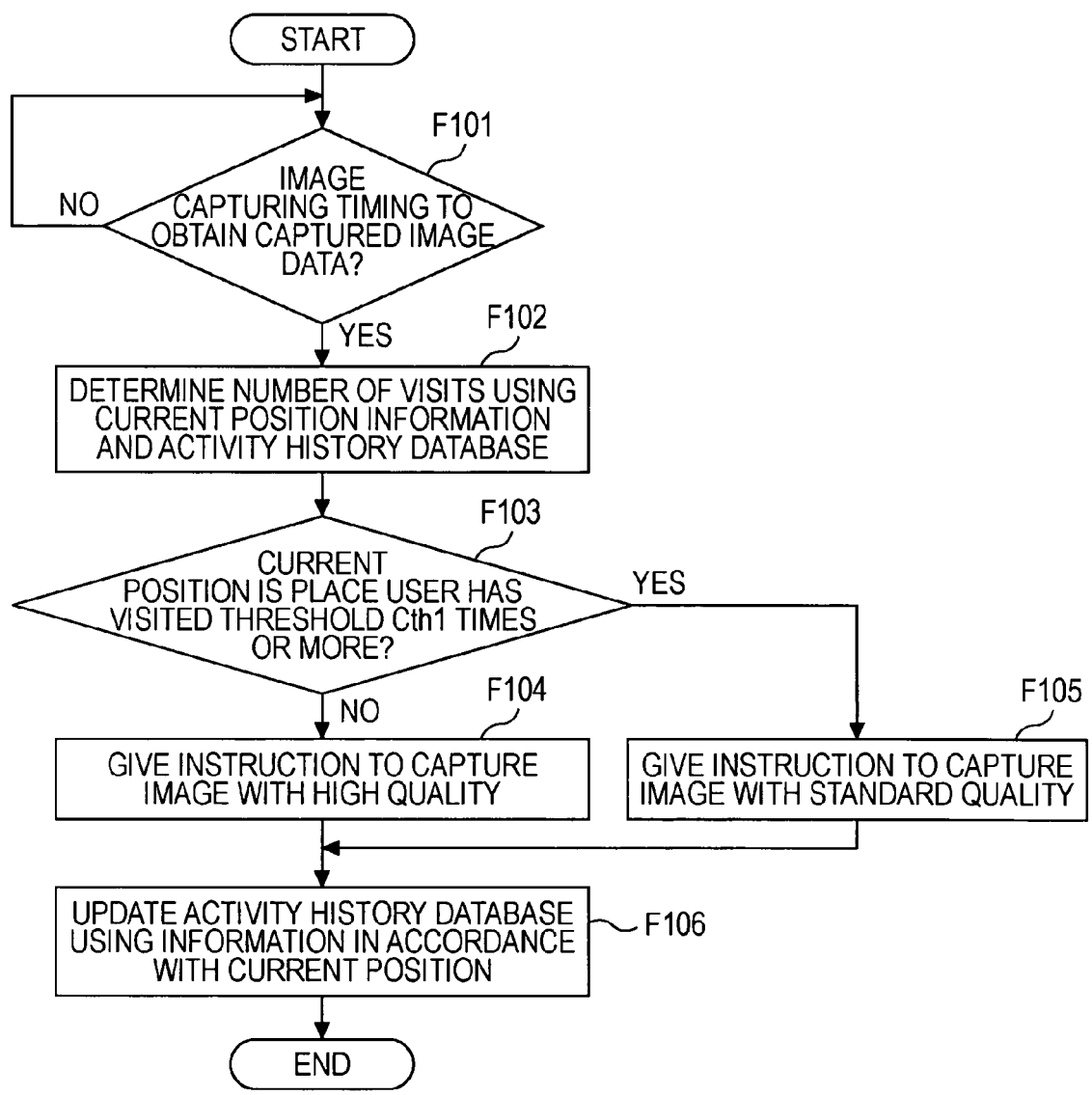

IMAGING APPARATUS THAT CAPTURES AN IMAGE OF A SUBJECT

CROSS REFERENCES TO RELATED APPLICATIONS

The present invention contains subject matter related to Japanese Patent Application JP 2007-216688 filed in the Japanese Patent Office on Aug. 23, 2007, the entire contents of which are incorporated herein by reference.

BACKGROUND OF THE INVENTION

1. Field of the Invention

The present invention relates to imaging apparatuses and imaging methods, and more particularly, to the technique suitable for an automatic image capturing operation of automatically capturing an image not in response to a shutter operation performed by a user.

2. Description of the Related Art

Cameras, such as lifelog cameras and life-slice cameras, which are worn by users and automatically and periodically capture images to save image data of scenes viewed by the users in everyday life have been proposed. By using a lifelog camera, a user can have image data of the user's activity history and memories. Exemplary techniques of such cameras are disclosed in Japanese Unexamined Patent Application Publication Nos. 2002-34030 and 2007-66251.

SUMMARY OF THE INVENTION

One lifelog camera can be assumed as, for example, a glasses-type or a head-mounted-type mounting unit that is equipped with a small imaging apparatus to capture images at constant time intervals and to save captured image data.

When a user wears such an imaging apparatus and behaves as usual in everyday life, the imaging apparatus is likely to capture and save many pictures of scenes taken at similar places, which are not so valuable for the user. For example, when the user takes the same route to commute to the user's office or school everyday, images of scenes on the route or places on the route are repeatedly captured. As a result, the imaging apparatus or an apparatus (e.g., a personal computer or the like) that saves image data transferred from the imaging apparatus stores many images of little value to the user. The recording capacity of a recording medium for saving the captured image data is consumed uselessly.

It is desirable to capture images in a more appropriate manner when an automatic image capturing operation for, for example, keeping a lifelog is performed.

An imaging apparatus according to an embodiment of the present invention includes the following elements: imaging means for performing, as an image capturing operation, a process of obtaining captured image data of a subject and saving the captured image data; position detecting means for detecting current position information; and control means for updating activity history information on the basis of the position information obtained by the position detecting means and, when performing image capturing control as an automatic image capturing process not based on a shutter operation performed by a user, setting an image capturing operation setting on the basis of the current position information detected by the position detecting means and the activity history information, and causing the imaging means to perform an image capturing operation based on the image capturing operation setting.

The control means may determine the number of previous visits to a place determined from the current position information detected by the position detecting means by referring to the activity history information and set the image capturing operation setting on the basis of a determination result.

The control means may set, as the image capturing operation setting, an image quality setting, an image size setting, an image capturing time interval setting, a frame rate setting, or a setting not to capture an image.

When a place determined from the current position information detected by the position detecting means is determined to be a place that has not been previously visited a predetermined number of times or more, the control means may set a dominant setting as the image capturing operation setting, and, when the place determined from the current position information detected by the position detecting means is determined to be a place that has been previously visited the predetermined number of times or more, the control means may set a non-dominant setting as the image capturing operation setting.

The dominant setting may be one of an image quality setting that sets a higher image quality than the image quality set by an image quality setting serving as the non-dominant setting, an image size setting that sets a larger size than the image size set by an image size setting serving as the non-dominant setting, an image capturing time interval setting that sets a shorter image capturing time interval than the image capturing time interval set by an image capturing time interval setting serving as the non-dominant setting, and a frame rate setting that sets a higher frame rate than the frame rate set by a frame rate setting serving as the non-dominant setting.

The imaging apparatus may further include time-and-date counting means for counting time-and-date information. The control means may set the image capturing operation setting on the basis of the current position information detected by the position detecting means, the activity history information, and the current time-and-date information counted by the time-and-date counting means.

Particularly in this case, the imaging apparatus may further include storage means for storing calendar information indicating holiday information of the user. The control means may determine, using the current time-and-date information counted by the time-and-date counting means and the calendar information, whether the current date is a holiday for the user and may set the image capturing operation setting to reflect a determination result.

The imaging apparatus may further include velocity detecting means for detecting a moving velocity. The control means may set the image capturing operation setting on the basis of the current position information detected by the position detecting means, the activity history information, and the moving velocity detected by the velocity detecting means.

Particularly in this case, the imaging apparatus may further include storage means for storing map information. When it is determined that the current position is on a transportation route on the basis of the current position information detected by the position detecting means and the map information, the control means may set the image capturing operation setting to reflect the moving velocity detected by the velocity detecting means.

An imaging method according to another embodiment of the present invention includes the steps of detecting current position information; updating activity history information on the basis of the obtained position information; and, when performing image capturing control as an automatic image capturing process not based on a shutter operation performed by a user, setting an image capturing operation setting on the basis of the detected current position information and the activity history information and performing an image capturing operation based on the image capturing operation setting.

According to the embodiments of the present invention, the control means updates the activity history information on the basis of the position information obtained by the position detecting means, thereby enabling the imaging apparatus to detect the user's activity history in everyday life (history of places the user has been or passed through).

For example, in order to automatically capture images for keeping a lifelog, it is conceivable that an imaging apparatus automatically captures images at constant time intervals (not based on a shutter operation performed by a user). In that case, according to the embodiments of the present invention, it is determined whether the place serving as the current position is a place valuable for the user to capture an image, and an image capturing operation setting used in capturing an image is changed.

For example, an image captured at a certain place has a different value for a user depending on whether the place is a frequently visited place or a rarely visited place. That is, it is preferable to capture a high-quality image at a rarely visited place. In contrast, when the user is at a frequently visited place, it may be considered that it is unnecessary to have a high-quality image. Accordingly, automatic image capturing can be performed in an appropriate manner in accordance with the user's activities by changing the image capturing operation setting according to place.

The word "place" used here refers to a place indicated by latitude and longitude, a place indicated as a section or a set area, a specific point, or a region with a certain range.

According to the embodiments of the present invention, a control operation is performed to adaptively switch the image capturing operation setting in the automatic image capturing operation according to the user's activities. That is, when images are captured at, for example, periodical intervals, the image quality (compression ratio) or the image size is switched or the time or frame rate serving as the image capturing interval is changed in accordance with whether the current position is a place the user frequently visits. Accordingly, in automatic image capturing, captured image data can be appropriately obtained in accordance with the user's activities, and images can be saved. For example, when the user is at a place the user visits rarely in everyday life, an image captured at that place is of great value to the user. Accordingly, high-quality image data is captured. In contrast, when the user is at a frequently visited place, an image captured at that place is not so valuable to the user. Accordingly, low-quality image data is captured. In this manner, an image capturing operation in accordance with the activities is performed.

BRIEF DESCRIPTION OF THE DRAWINGS

FIGS. 3A and 3B are illustrations of an activity history database according to the embodiment;

FIG. 4 is an illustration of activities performed by a user of the imaging apparatus and an image capturing operation setting according to the embodiment;

FIG. 5 is a flowchart of a first example of an image capturing processing operation according to the embodiment;

DESCRIPTION OF THE PREFERRED EMBODIMENTS

Embodiments of the present invention will be described below. Descriptions are given in the following order:
1. Exemplary Appearance of Imaging Apparatus
2. Exemplary Structure of Imaging Apparatus
3. First Example of Image Capturing Processing Operation
4. Second Example of Image Capturing Processing Operation
5. Third Example of Image Capturing Processing Operation
6. Fourth Example of Image Capturing Processing Operation
7. Fifth Example of Image Capturing Processing Operation
8. Sixth Example of Image Capturing Processing Operation
9. Seventh Example of Image Capturing Processing Operation
10. Eighth Example of Image Capturing Processing Operation
11. Advantages and Modifications of Embodiment
1. Exemplary Appearance of Imaging Apparatus An imaging apparatus 1 according to the embodiment may have various forms. Examples of the appearance of the imaging apparatus 1 are illustrated in FIGS. 1A and 1B.

Figure 1A:
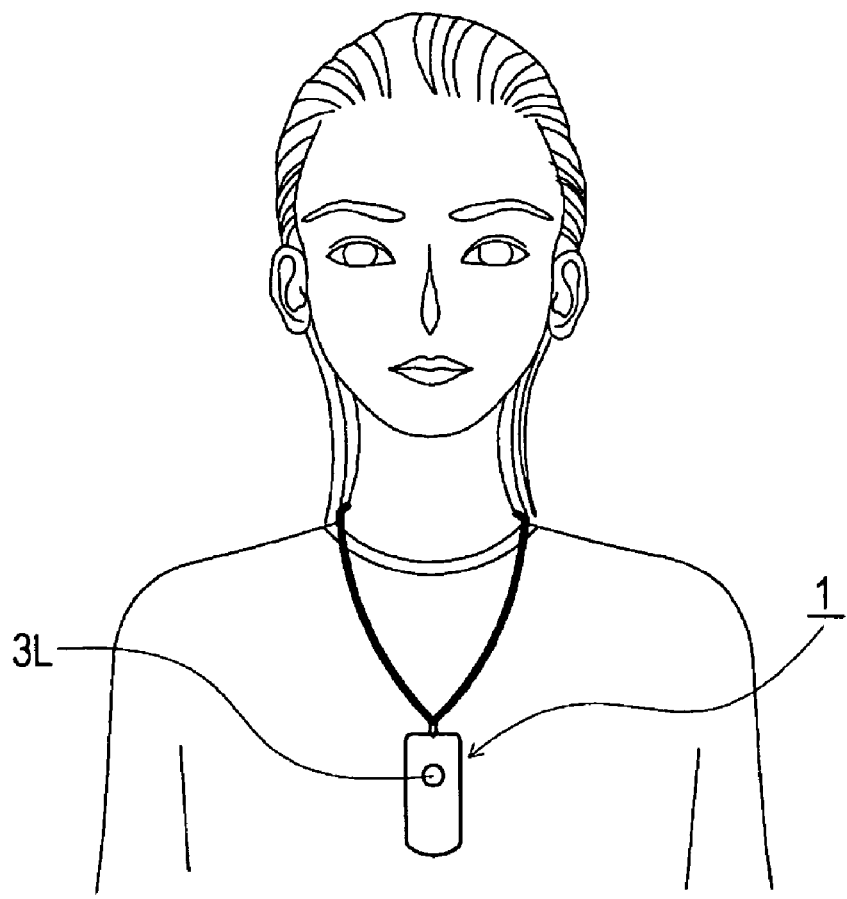
FIGS. 1A and 1B are illustrations of examples of the appearance of an imaging apparatus according to an embodiment of the present invention.

FIG. 1A shows the neck-hung-type imaging apparatus 1. This imaging apparatus 1 has, for example, a portion where a strap can be attached. A strap is attached to this portion, and, as shown in the illustration, the imaging apparatus 1 is worn by the user by hanging it on the neck of the user. It is only necessary for the user to wear the imaging apparatus 1 so that an imaging lens 3L included in the imaging apparatus 1 can capture images with the user's front direction coinciding with a subject direction.

Although not shown in the illustration, for example, a display unit used to serve as an imaging monitor or to reproduce captured images may be provided on the back of the imaging apparatus 1.

Figure 1B:
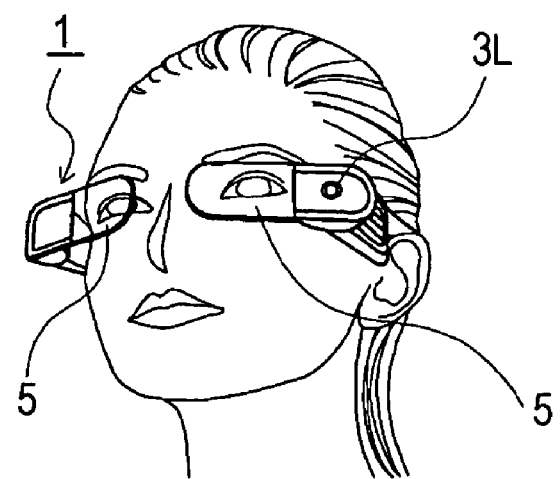

FIG. 1B shows the imaging apparatus 1 which is a glasses-type display camera. The imaging apparatus 1 has, for example, a mounting unit with a frame structure that rotates halfway from the temporal regions to the occipital region. The imaging apparatus 1 is worn by the user by fitting it to the pinnae, as shown in the illustration.

When the imaging apparatus 1 is worn by the user, the imaging lens 3L is positioned facing front so that the imaging apparatus 1 can capture images with the user's viewing direction coinciding with the subject direction.

When the imaging apparatus 1 is worn by the user as shown in the illustration, a pair of display units 5 for the left and right eyes is arranged immediately in front of the eyes of the user, that is, at positions where the lenses of a general type of glasses are located. For example, liquid crystal panels are used in the display units 5. By controlling the transparency of the display units 5, the display units 5 can be in a through state shown in the illustration, that is, a transparent or translucent state. Since the display units 5 are in a through state, when the user constantly wears the imaging apparatus 1 as wearing glasses, the user can conduct everyday life without any trouble.

Instead of providing the pair of display units 5 for both eyes, only one display unit 5 may be provided for one eye. Alternatively, a structure including no display unit 5 is also conceivable.

In FIG. 1A or 1B, the neck-hung-type or glasses-type imaging apparatus 1 has been illustrated. Alternatively, various other structures are conceivable for enabling the user to wear the imaging apparatus 1. The mounting unit may be, for example, a headphone type, a neckband type, or an ear clip type. That is, the mounting unit may be any type as long as the imaging apparatus 1 can be worn by the user. Further, the imaging apparatus 1 may be worn by the user by attaching it to, for example, a general type of glasses, a visor, or headphones using a fixture such as a clip. Alternatively, the imaging apparatus 1 may not necessarily be worn on the head of the user.

In the case shown in FIG. 1A, the image capturing direction is the user's front direction. Alternatively, when the imaging apparatus 1 is worn by the user, the imaging apparatus 1 may be arranged so that the imaging apparatus 1 can capture images behind the user.

In the case shown in FIG. 1B, the image capturing direction is the user's viewing direction. Alternatively, when the imaging apparatus 1 is worn by the user, the imaging lens 3L may be arranged so that the imaging apparatus 1 can capture images behind, beside, above, or below the user. Alternatively, multiple imaging systems having the same or different image capturing directions may be provided.

Figure 13:
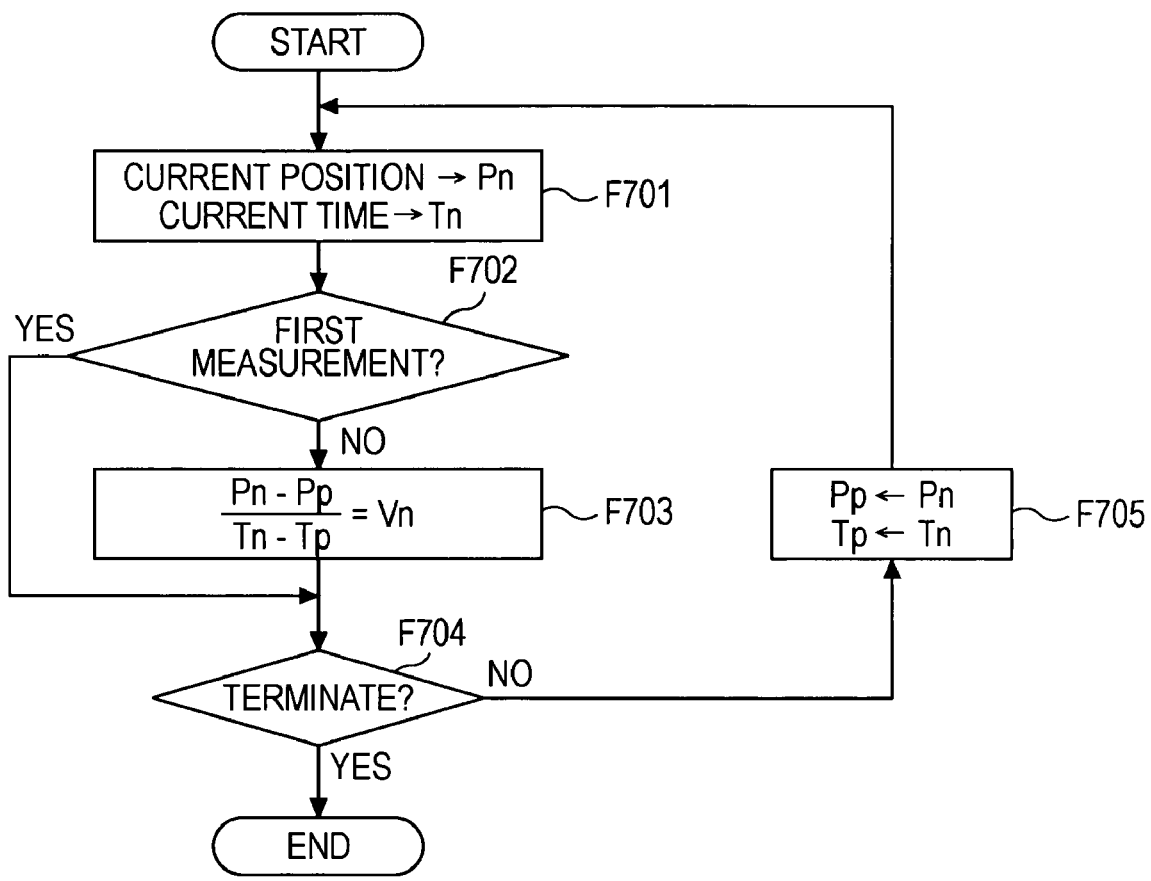
FIG. 13 is a flowchart of a velocity detecting process in seventh and eighth examples of the image capturing processing operation according to the embodiment.

Further, referring to FIGS. 1A and 13, the imaging apparatus 1 may include an image-capturing-direction changing mechanism that can manually or automatically change the subject direction of one or more imaging lenses 3L.

As an imaging apparatus for capturing moving and still images, forms other than those shown in FIGS. 1A and 1B are conceivable. For example, an imaging apparatus that can be mounted on a vehicle and capture images inside or outside the vehicle is conceivable as the imaging apparatus 1 according to the embodiment. This includes, for example, an imaging apparatus mounted so as to capture images inside the vehicle and an imaging apparatus mounted so as to capture images of scenes in front of or behind the vehicle.

Furthermore, an apparatus such as a cellular phone, a personal digital assistant (PDA), or a portable personal computer which has the function of an imaging apparatus is conceivable as the imaging apparatus 1 according to the embodiment.

In addition, in these various forms, for example, a microphone for collecting external sounds may be provided. When an image is captured, an audio signal to be recorded together with image data may be obtained. Further, a loudspeaker or an earphone for outputting sounds may be formed.

In the vicinity of the imaging lens 3L, a light-emitting unit for illuminating in the subject direction may be provided using, for example, a light-emitting diode (LED), or a flash light-emitting unit for capturing still images may be provided.

2. Exemplary Structure of Imaging Apparatus

An exemplary structure of the imaging apparatus 1 according to the embodiment is described.

Figure 2:
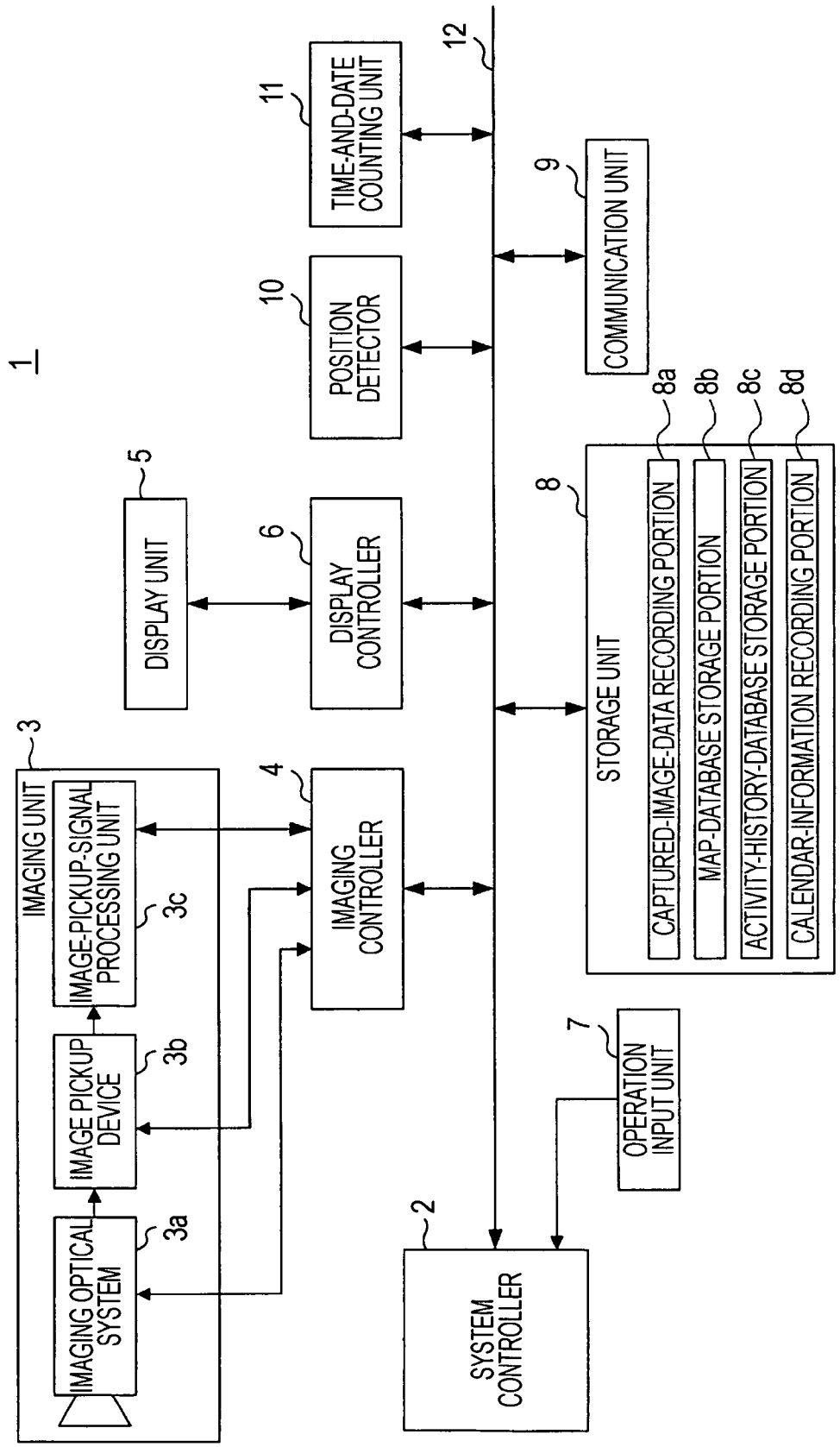
FIG. 2 is a block diagram of the imaging apparatus according to the embodiment.

FIG. 2 is a block diagram showing an internal structure of the imaging apparatus 1.

As shown in the block diagram, the imaging apparatus 1 includes a system controller 2, an imaging unit 3, an imaging controller 4, a display unit 5, a display controller 6, an operation input unit 7, a storage unit 8, a communication unit 9, a position detector 10, and a time-and-date counting unit 11.

The system controller 2 is implemented by, for example, a microcomputer including a central processing unit (CPU), a read-only memory (ROM), a random access memory (RAM), a non-volatile memory, and an interface. The system controller 2 controls the overall imaging apparatus 1. On the basis of a program stored in the internal ROM or the like, the system controller 2 performs various arithmetic operations and exchanges control signals or the like with components of the imaging apparatus 1 via a bus 12 to cause the components to perform necessary operations.

The imaging unit 3 includes an imaging optical system 3a, an image pickup device 3b, and an image-pickup-signal processing unit 3c.

The imaging optical system 3a in the imaging unit 3 includes a lens system including the imaging lens 3L shown in FIG. 1, an aperture, a zoom lens, and a focus lens, a drive system for causing the lens system to perform a focus operation and a zoom operation, and the like.

In the image pickup device 3b in the imaging unit 3, an array of solid-state image pickup elements for detecting imaging light obtained by the imaging optical system 3a and generating image pickup signals by performing photoelectric conversion is provided. The array of solid-state image pickup elements is, for example, a charge-coupled device (CCD) sensor array or a complementary metal-oxide semiconductor (CMOS) sensor array.

The image-pickup-signal processing unit 3c in the imaging unit 3 includes a sample-hold circuit and an automatic gain control (AGC) circuit for performing gain adjustment and waveform shaping of signals obtained by the solid-state image pickup elements and a video analog-to-digital (A/D) converter for obtaining captured image data as digital data. The image-pickup-signal processing unit 3c applies white balance processing, luminance processing, and color signal processing to the captured image data.

With the imaging unit 3 including the imaging optical system 3a, the image pickup device 3b, and the image-pickup-signal processing unit 3c, an image is captured, and captured image data is obtained.

Image data obtained by performing an image capturing operation using the imaging unit 3 is processed by the imaging controller 4.

Under control of the system controller 2, the imaging controller 4 performs processes including an image compression process of compressing captured image data with various compression ratios, an image-size converting process, and an image-format converting process, and, in accordance with an operating state, a process of transferring the captured image data to the storage unit 8, the display controller 6, the communication unit 9, and the like.

On the basis of an instruction issued by the system controller 2, the imaging controller 4 controls switching on and off the image capturing operation of the imaging unit 3, shutter processing, driving of the zoom lens and the focus lens in the imaging optical system 3a, the sensitivity and frame rate of the image pickup device 3b, and parameters of processes performed by the image-pickup-signal processing unit 3c and sets processes to be executed.

In the imaging apparatus 1, a structure configured to display images to the user includes the display unit 5 and the display controller 6.

The display unit 5 includes a display panel portion implemented by, for example, a liquid crystal panel and a display drive portion for driving the display panel portion to display images. The display drive portion is implemented by a pixel drive circuit for displaying an image represented by image data supplied from the imaging controller 4 on the display panel portion. The pixel drive circuit applies drive signals based on video signals to pixels arranged in a matrix in the display panel portion at predetermined horizontal and vertical drive timings and causes the pixels to display an image.

Under control of the system controller 2, the display controller 6 drives the pixel drive circuit in the display unit 5 to perform a predetermined display operation. For example, an image captured by the imaging unit 3 is displayed on a monitor, or an image reproduced from the storage unit 8 is displayed.

In order to display such images, for example, luminance-level adjustment, color correction, contrast adjustment, sharpness (contour enhancement) adjustment, and the like can be performed. Furthermore, image effect processing including generation of an enlarged image by enlarging part of image data, generation of a size-reduced image, soft focusing, mosaic, luminance inversion, highlighting (enhancing) part of the image, and changing the overall tone can be performed.

The operation input unit 7 includes operation members such as keys, buttons, and/or a dial and is used to enter power on/off operations, operations related to automatic image capturing, and necessary input operations. When the imaging apparatus 1 is configured not only to perform the automatic image capturing operation but also to capture images in response to a shutter operation performed by the user, the operation input unit 7 may further include operation members to enter user operations related to image capturing, such as a shutter operation, a zooming operation, an exposure setting operation, and a self timer operation.

The operation input unit 7 supplies information obtained from these operation members to the system controller 2, and the system controller 2 performs necessary arithmetic operations and control operations corresponding to the supplied information.

The position detector 10 is, for example, a Global Positioning System (GPS) receiver. The GPS receiver receives radio waves from GPS satellites and outputs latitude and longitude information serving as the current position to the system controller 2.

Alternatively, the position detector 10 may use wireless fidelity (WiFi) or a position information service provided by a cellular phone company.

The time-and-date counting unit 11 constantly performs a time-and-date counting operation and counts the seconds, minutes, hours, days, months, and years. In the block diagram, the time-and-date counting unit 11 is a block separate from the system controller 2. Alternatively, a time-and-date counting unit serving as an internal timer in the system controller 2 may be provided.

The storage unit 8 is used to save captured image data and other various items of data.

The storage unit 8 may be implemented by a fixed memory, such as a flash memory, or may be implemented by, for example, a hard disk drive (HDD).

Alternatively, the storage unit 8 may be implemented by, instead of an internal recording medium, a read/write drive corresponding to recording media such as portable recording media, such as a memory card including a fixed memory, an optical disk, a magneto-optical disk, and a hologram memory.

Alternatively, the storage unit 8 may include both types, namely, an internal-type memory such as a fixed memory or HDD and a read/write drive corresponding to portable recording media.

Under control of the system controller 2, the storage unit 8 records/reproduces captured image data and other various items of data.

The storage unit 8 includes a captured-image-data recording portion 8a, a map-database storage portion 8b, an activity-history-database storage portion 8c, and a calendar-information recording portion 8d, which serve as recording areas.

The captured-image-data recording portion 8a is an area that stores captured image data obtained by the imaging unit 3. For example, when images are captured at constant time intervals, which serves as an automatic image capturing operation performed on a periodical basis, items of captured image data are recorded in the captured-image-data recording portion 8a at this constant time intervals.

The map-database storage portion 8b records a map database. The map database is a database in which, for example, sections, regions, areas, the names of places, the names of facilities, and public transportation routes serving as positions on a map can be distinguished from one another on the basis of latitude and longitude information. In this example, map rendering data is unnecessary since a map is not particularly displayed. It is only necessary that an area including the current position (area in an activity history database) be determined from the current position information.

When the map database is used in the eighth example of the image capturing processing operation, which will be described later, it is necessary that the map database be a database including route information of public transportation, such as trains and buses.

The activity-history-database storage portion 8c records an activity history database. The activity history database is, as shown in FIG. 3A, a database that sequentially and additionally registers areas AR (AR1, AR2, AR3, . . . ) that the user carrying the imaging apparatus 1 has visited and the number of times the user has visited the individual areas. The areas the user has visited include not only destinations in the user's everyday life but also places the user has simply passed through. That is, the activity history database is a database that manages areas including places the user has visited or passed through and the number of times the user has visited (passed through) the individual areas.

As will be described later, when capturing an image, the system controller 2 searches the map database for an area including the current position on the basis of position information detected by the position detector 10. When the current area is already registered in the activity history database, the system controller 2 adds one to information indicating the number of times corresponding to that area. When the area including the current position is an area that is not registered in the activity history database, the system controller 2 adds this area to the activity history database and registers the number of times "1".

The areas AR in the activity history database may be set as areas corresponding to administrative regions such as sections or the names of places or as ranges that have been arbitrarily defined and set, such as areas within a predetermined radius of a certain point or areas in a quadrate range. Alternatively, areas based on base stations or the like in a cellular phone communication network or the like may be set.

In the example shown in FIG. 3A, it is assumed that information indicating the number of times the user has visited each of the areas AR is registered in the activity history database. Alternatively, for example, as shown in FIG. 3B, the activity history database may be in a format in which the number of visits is registered correspondingly with latitude/longitude position information P1, P2, P3, . . . itself.

In this case, when capturing an image, the system controller 2 searches the activity history database on the basis of position information (latitude and longitude) detected by the position detector 10. When the current position is already registered in the activity history database, the system controller 2 adds one to information indicating the number of times corresponding to that position information P(x). When the current position is not registered in the activity history database, the system controller 2 newly adds the latitude and longitude serving as the current position as position information P to the activity history database and registers the number of times "1".

When the activity history database is in the format shown in FIG. 3B, the map database used to determine the current area in the format shown in FIG. 3A, which has been described above, becomes unnecessary.

The calendar-information recording portion 8d records calendar information. The calendar information in this case is information indicating the user's holidays.

For example, the system controller 2 displays an input screen for prompting the user to enter the user's holiday information on the display unit 5. The user enters the user's scheduled holidays using the operation input unit 7, thereby forming calendar information indicating the user's holidays and recording the calendar information in the calendar-information recording portion 8d. In a state where the user has entered no holidays, calendar information is simply information that manages general holiday information including, for example, Saturdays, Sundays, and public holidays as holidays.

The system controller 2 refers to the current date obtained by the time-and-date counting unit 11 and the calendar information recorded in the calendar-information recording portion 8d, thereby determining whether the current date is a holiday for the user.

The captured-image-data recording portion 8a, the map-database storage portion 8b, the activity-history-database storage portion 8c, and the calendar-information recording portion 8d are not necessary to be set as fixed areas in the storage unit 8. In this example, it is only necessary that the captured image data, map database, activity-history database, and calendar information be stored in the storage unit 8. Alternatively, for example, the calendar information, activity history database, and the like may be stored in an internal memory in the system controller 2.

The communication unit 9 is provided as a unit that performs data communication with various external apparatuses.

For example, the communication unit 9 may perform data transmission/reception with a server apparatus which is not shown. In this case, for example, the communication unit 9 may be configured to perform network communication with a network access point using a short-distance wireless communication protocol, such as a wireless local area network (LAN) or Bluetooth, or may directly perform wireless communication with a server apparatus with a corresponding communication function.

Furthermore, the communication unit 9 may be connected to an apparatus, such as a personal computer, using an interface such as Universal Serial Bus (USB) and perform data transmission/reception.

With the communication unit 9, for example, captured image data obtained by capturing an image and stored in the storage unit 8 can be transferred to a personal computer or another external apparatus. Accordingly, many items of captured image data obtained by periodically capturing images to keep a lifelog and recorded in the storage unit 8 can be reproduced by the imaging apparatus 1 itself and images thereof can be displayed on the display unit 5. Furthermore, these items of captured image data can be transferred to an external apparatus, such as a personal computer, and the external apparatus can reproduce the captured image data and display images thereof.

The structure of the imaging apparatus 1 has been described above. However, this is only one example. Additions and deletions of various structural elements can be made in accordance with the actually implemented exemplary operations and functions.

3. First Example of Image Capturing Processing Operation

Characteristic exemplary operations of the imaging apparatus 1 according to the embodiment described above will be described below.

When the imaging apparatus 1 of the embodiment is used to keep a lifelog, the imaging apparatus 1 basically performs an image capturing operation not based on a shutter operation performed by the user. For example, the imaging apparatus 1 periodically and automatically captures images and saves captured image data in the storage unit 8. For example, the imaging apparatus 1 automatically captures images at constant time intervals, such as every five seconds, ten seconds, or thirty seconds. Instead of periodically capturing images, the imaging apparatus 1 may automatically capture images at an irregular timing in accordance with certain triggers (triggers other than the user's shutter operations). Further, when the user performs a shutter operation while the imaging apparatus 1 is performing a periodical or irregular automatic image capturing operation, the imaging apparatus 1 may perform normal image capturing processing at, that point.

When the user wears the imaging apparatus 1 in everyday life and the imaging apparatus 1 automatically captures images on a periodical basis, images of scenes in accordance with the user's activities are captured. The user's activities in everyday life include regular activities and irregular activities. For example, commuting to office or school is an activity that is more or less regular. The user visits or passes through the same places.

FIG. 4 shows one example. FIG. 4 shows a map illustrating the user's home h1 and office w1. A portion A1 hatched with slanted lines is assumed to be the user's commuting route. Places included in this hatched portion A1 are areas the user visits (passes through) many times when the user is on his/her way to the office w1.

In contrast, hatched portions A2 and A3 are areas the user has been outside of the commuting area. Places included in the hatched portions A2 and A3 can be regarded as places the user visits (passes through) not so frequently.

Besides the commuting area, there may be places the user frequently visits. At any rate, it can be regarded that each user has places the user frequently visits and places the user visits not so frequently.

Captured image data stored as a result of automatically capturing images is considered. When the user wears the imaging apparatus 1 everyday and moves and performs activities as shown in FIG. 4, the imaging apparatus 1 automatically captures images. As a result, many items of captured image data are captured in areas included in the hatched portion A1, which is the commuting route, and are stored. Although details of images captured in the same place change on a daily basis, in most of the cases, it is assumed that many not so different images are stored. These images are often not so valuable to the user when the user reproduces and views them at a later time.

In contrast, images captured at places in the hatched portions A2 and A3, which are places the user visits not so frequently, can be regarded as being of great value to the user.

In this example, using the foregoing activity history database, it is determined whether the current place is a place the user frequently visits. When the current place is a place the user visits not so frequently, images are captured with a relatively dominant image capturing operation setting. In contrast, when the current place is a place the user frequently visits, images are captured with a non-dominant setting.

The image capturing operation setting includes an image quality setting, an image size setting, or an image capturing interval setting.

The image quality setting sets the image quality of captured image data. The image quality setting may be set by, for example, setting a high or low compression ratio. That is, captured image data obtained by the imaging unit 3 is compressed by the imaging controller 4 using a predetermined compression method, and the compressed captured image data is transferred to the storage unit 8 and recorded in the captured-image-data recording portion 8a. When the compression ratio used in compression processing becomes higher, the amount of data becomes smaller, but the quality of captured image data saved becomes lower. In contrast, when the compression ratio becomes lower (or when data is not compressed), the amount of data becomes larger, but the quality of captured image data saved becomes higher.

Accordingly, the quality of image data to be saved can be changed by setting a high or low compression ratio setting, and hence, the storage capacity can be efficiently used.

The image size setting can be regarded as, for example, the number of pixels of captured image data. For example, the image size according to the number of pixels in the image pickup device 3b serves as the maximum. For example, when the number of pixels is reduced by pixel decimation processing, the image size becomes smaller.

When the image size becomes larger, the image quality becomes higher, but the amount of data becomes larger. In contrast, when the image size becomes smaller, the image quality becomes lower, but the amount of data becomes smaller.

The image capturing interval setting is the setting of a time serving as an image capturing interval in the case where images are automatically captured on a periodical basis, as has been described above. When the image capturing interval becomes shorter, many items of captured image data are obtained, which is more suitable to keep a lifelog. However, a large recording capacity is necessary as a whole. In contrast, when the image capturing interval becomes longer, chances of capturing images become less. However, the recording capacity can be saved as a whole. For example, a setting that switches the image capturing interval between a ten-second interval and a thirty-second interval is conceivable.

Among these image capturing operation settings, the dominant setting described above is a setting that reduces the compression ratio, a setting that increases the image size, or a setting that shortens the image capturing interval.

In contrast, the non-dominant setting is a setting that increases the compression ratio, a setting that reduces the image size, or a setting that extends the image capturing interval.

Images are captured with the dominant setting in places the user visits not so frequently. In contrast, images are captured with the non-dominant setting in places the user frequently visits. Accordingly, the quality or the number of pictures of scenes taken at rare places becomes high, and the quality or the number of pictures of scenes taken at familiar places becomes low.

Figure 6:
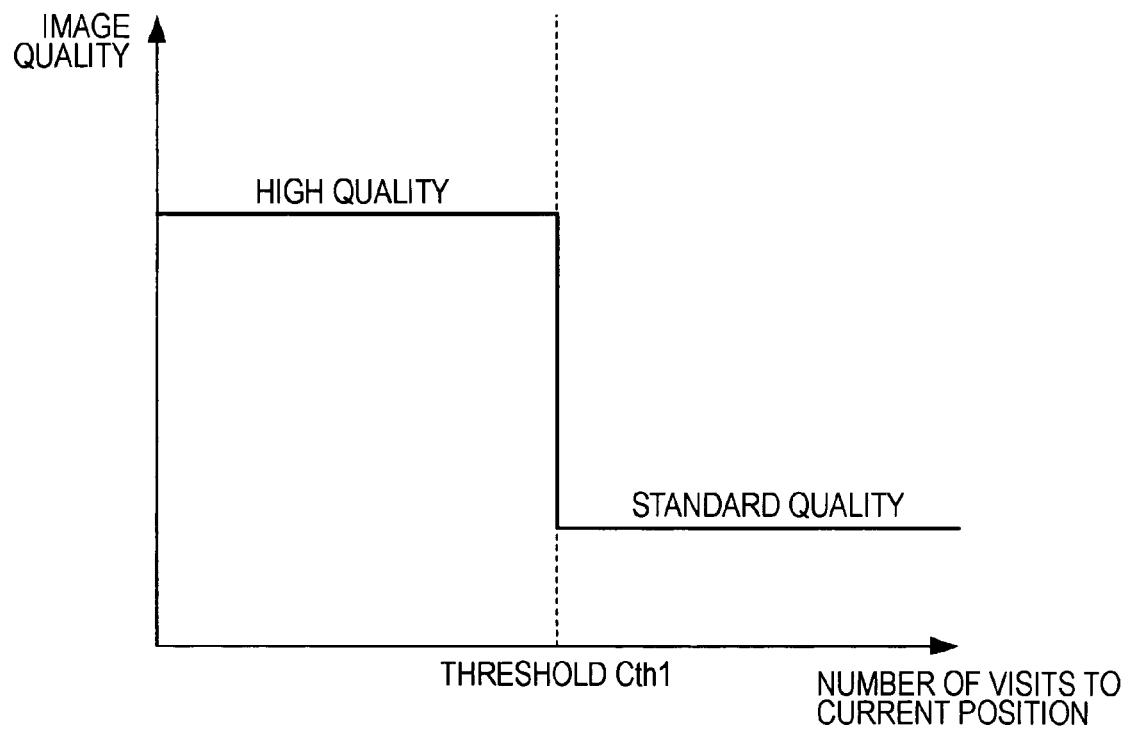
FIG. 6 is an illustration of an image capturing operation setting in the first example of the image capturing processing operation according to the embodiment.

Using FIGS. 5 and 6, an exemplary control process for achieving the automatic image capturing operation including such an image capturing operation setting is described. Here, the example in which, as the image capturing operation setting, the compression ratio is changed will be described.

FIG. 5 illustrates a control process executed by the system controller 2 on the basis of a program stored in the internal ROM.

During the execution of automatic image capturing, the system controller 2 counts time serving as an image capturing interval using, for example, an internal timer. In accordance with counting of a predetermined time, such as every ten seconds, the system controller 2 determines that an image capturing timing is reached, and the flow proceeds from step F101 to step F102.

In step F102, the system controller 2 obtains position information detected by the position detector 10. For example, the system controller 2 obtains latitude and longitude information serving as the current position. Using the current position information and the activity history database, the system controller 2 performs a process of determining whether the current position is a place the user frequently visits.

For example, when the activity history database is in the format shown in FIG. 3A, the system controller 2 refers to the map database on the basis of the latitude and longitude serving as the current position and determines an area AR including the current position. Next, the system controller 2 determines whether the current area is an area registered in the activity history database.

Updating of the activity history database is performed in step F106, which is described later. That is, every time one still image is captured as a result of the process shown in FIG. 5, which is the automatic image capturing process, the activity history database is updated. Accordingly, when the current area is registered in the activity history database, the place the user currently is is a place where automatic image capturing has been performed in the past. The number of times the user has visited this place and the imaging apparatus 1 has automatically captured images is stored in the activity history database.

When the activity history database is in the format shown in FIG. 3B, the processing in step F102 is just necessary to be performed in the following manner.

On the basis of the latitude and longitude serving as the current position, the system controller 2 refers to the activity history database and determines whether position information P of the latitude and longitude serving as the current position is registered in the activity history database. When the position information P is registered in the activity history database, the place the user currently is a place where automatic image capturing has been performed in the past. The number of times the imaging apparatus 1 has automatically captured images in the past is stored in the activity history database.

Depending on the accuracy of units of position information P of the latitude and longitude, that is, in accordance with the fineness of seconds, minutes, and degrees serving as units of position information P of the latitude and longitude or the actual distance corresponding to the minimum unit, even when position information P coinciding with the current position is not registered, if nearby position information P (with a difference of about 10 m) is registered, it is preferable to determine that this place is a place the user has visited in the past.

With the processing in step F102, the system controller 2 can determine whether the place the user currently is a place the user has visited in the past and the automatic image capturing has been performed in the past and further can determine the number of times the automatic image capturing has been performed.

In step F103, the system controller 2 compares the number of previous times registered in the activity history database (that is, the number of times the automatic image capturing has been performed in the past) with a predetermined threshold Cth1 to determine whether the current place is a place the user frequently visits. Suppose that the threshold Cth1 is "10". When the number of times registered in the activity history database is ten or more, it is determined that the current position is a place the user frequently visits. When the number of times is less than nine (or not registered in the activity history database), it is determined that the current position is a place the user visits not so frequently.

When it is determined that the current place is a place the user frequently visits, the system controller 2 advances the process to step F105, gives an instruction to set the image capturing operation setting to a standard image quality, and gives an instruction execute an image capturing operation.

In contrast, when it is determined that the current place is a place the user visits not so frequently, the system controller 2 advances the process to step F104, gives an instruction to set the image capturing operation setting to a high image quality, and gives an instruction to execute an image capturing operation.

That is, as shown in FIG. 6, when the number of times the user has previously visited the place the user currently is (the number of times the automatic image capturing has been performed in the past) is greater than or equal to the threshold Cth1, the system controller 2 gives an instruction to capture a standard-quality image. When the number of times is less than the threshold Cth1, the system controller 2 gives an instruction to capture a high-quality image.

The high image quality in step F104 corresponds to the above-described dominant setting, which is, for example, the image capturing operation setting for executing compression processing with a low compression ratio (or executing no compression). In this case, the imaging controller 4 compresses captured image data obtained by the imaging unit 3 with a relatively low compression ratio (or does not compress captured image data) and transfers the captured image data to the storage unit 8. The storage unit 8 saves the transferred captured image data as a still image.

In contrast, the standard image quality in step F105 corresponds to the above-described non-dominant setting, which is the image capturing operation setting for executing compression processing with a predetermined standard compression ratio (compression ratio higher than that in step F104). In this case, the imaging controller 4 compresses captured image data obtained by the imaging unit 3 with a relatively high compression ratio and transfers the captured image data to the storage unit 8. The storage unit 8 saves the transferred captured image data as a still image.

Since the system controller 2 performs the control process in step F104 or F105, one still image that has been automatically captured is recorded in the storage unit 8.

Next in step F106, the system controller 2 updates the activity history database using information in accordance with the current position.

For example, when the activity history database is in the format shown in FIG. 3A, if the current area determined in step F102 is already registered in the activity history database, the system controller 2 adds one to the number of times corresponding to that area. In contrast, when the current area is not registered in the activity history database, the system controller 2 additionally registers the current area in the activity history database and registers the number of times "1".

When the activity history database is in the format shown in FIG. 33, if the current position information is already registered in the activity history database, the system controller 2 adds one to the number of times corresponding to the position information. When the current position information is not registered in the activity history database, the system controller 2 additionally registers the current position information in the activity history database and registers the number of times "1".

With step F106, the system controller 2 ends the process relating to one automatic image capturing process. Thereafter, the system controller 2 again starts counting time using the internal timer. After the predetermined time has elapsed (for example, after ten seconds), the system controller 2 determines in step F101 that the image capturing timing is reached and executes the process from step F102 onward.

That is, the system controller 2 executes the process shown in FIG. 5 at, for example, ten-second intervals, thereby storing captured image data which has been automatically captured at, for example, ten-second intervals. The captured image data stored has different quality and amount depending on whether the image capturing place is a place the user frequently visits.

For example, an image captured when the user is within or passes through the hatched portion A1, which is the user's commuting route shown in FIG. 4, is saved as a relatively low-quality image with a small amount of data, as a result of the processing in step F105. In contrast, when the user is for a change in an area in the hatched portion A2, an image captured in the hatched portion A2 is saved as, as a result of processing in step F104, a relatively high-quality image with a large amount of data.

In FIG. 5, as the image capturing operation setting, the compression ratio is set in accordance with the current place. Alternatively, the foregoing image size setting can be similarly performed. That is, the system controller 2 gives an instruction to set the image size to a large size in step F104, and gives an instruction to set the image size to a relatively small size in step F105.

Alternatively, the system controller 2 may set both the compression ratio and the image size.

Further, the system controller 2 can additionally set the image capturing interval. Regarding the image capturing interval, the system controller 2 sets the interval to a short interval (e.g., five seconds) at the time in step F104, and to a relatively long interval (e.g., fifteen seconds) in step F105. When this setting is set, the system controller 2 may change the reference for determining the image capturing timing in step F101. That is, it is only necessary to switch, as the processing in step F101, between the process in which the image capturing timing is reached when five seconds have elapsed after the last image capturing operation and the process in which the image capturing timing is reached when fifteen seconds have elapsed after the last image capturing operation.

In the second to eighth examples of the image capturing processing operation described later, examples in which the compression ratio, which is an example of the image capturing operation setting, is changed will be described. In these examples of the operation, the image size or the image capturing interval may be changed.

4. Second Example of Image Capturing Processing Operation

In the first example of the image capturing processing operation described above, the image quality of an image to be saved is changed depending on whether the number of visits is greater than or equal to the threshold Cth1. In addition to this process, an exemplary process in which no image is captured at a place the user visits too frequently is conceivable. For example, suppose that the threshold Cth1 is ten. At a place the user has visited ten or more times, an image is captured with the foregoing non-dominant setting. At a place the user has visited thirty or more times, no image is captured. This process is appropriate since many similar images are not wastefully stored.

Figure 7:
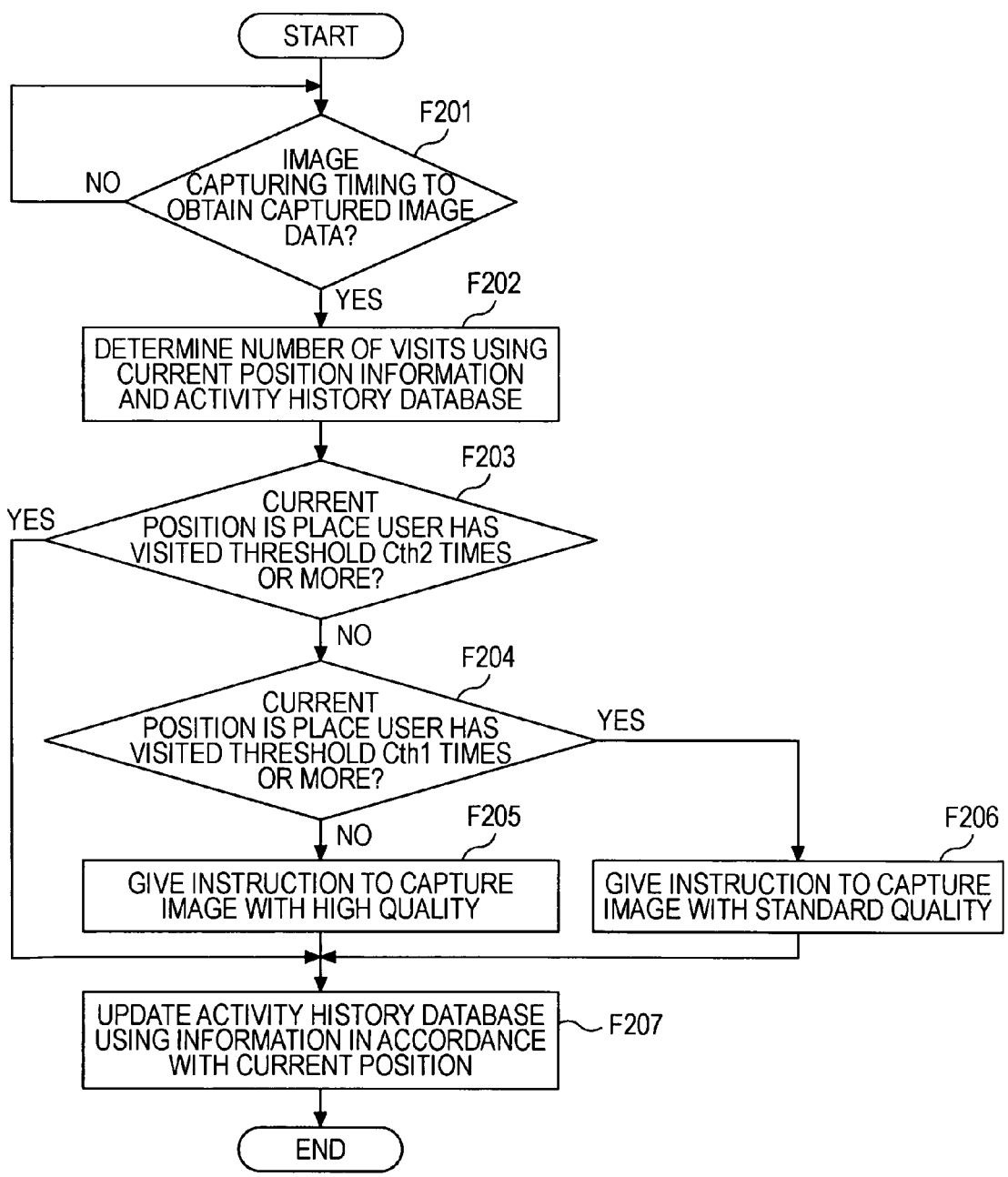
FIG. 7 is a flowchart of a second example of the image capturing processing operation according to the embodiment.

An exemplary process additionally including the case in which no image is captured in such a case is described as the second example of the image capturing processing operation using FIG. 7.

FIG. 7 illustrates a process performed by the system controller 2. In FIG. 7, steps F201 and F202 are the same as steps F101 and F102 of FIG. 5 described above.

That is, when the image capturing timing, which is, for example, a periodical time interval, is reached, the system controller 2 determines the number of previous visits to the place the user currently is using the current position information and the activity history database.

In the case shown in FIG. 7, in step F203, the system controller 2 compares the number of visits to the current position, which is recognized from the activity history database, with a threshold Cth2. The threshold Cth2 is, for example, "30", based on which whether the current position is a very frequently visited place can be determined.

When the current position is a place the user has visited in the past the number of times which is greater than or equal to the threshold Cth2 and the automatic image capturing has been performed, the system controller 2 advances the process from step F203 to step S207 and updates the activity history database on the basis of the current position information. That is, the system controller 2 adds one to information indicating the number of times corresponding to the area ARx (in the case of FIG. 3A) or the position information Px (in the case of FIG. 3B) corresponding to the current position, which is registered in the activity history database.

When it is determined in step F203 that the current position is a place that has not been visited in the past the number of times which is greater than or equal to the threshold Cth2, the system controller 2 proceeds to step F204. Steps F204, F205, and F206 are the same as steps F103, F104, and F105 of FIG. 5. When the number of previous visits is compared with the threshold Cth1 and the current position is a frequently visited place, an instruction to capture a standard-quality image is given. When the current position is a not so frequently visited place, an instruction to capture a high-quality image is given.

In step F207, as in step F106 of FIG. 5, the activity history database is updated in accordance with the current position, and the process ends.

The process of FIG. 7 is repeated at predetermined time intervals. Accordingly, no still image is automatically captured and saved at a place the user visits too frequently.

In the example of FIG. 7, the example in which the process is switched among three levels, namely, image capturing with the dominant setting, image capturing with the non-dominant setting, and no image capturing, has been described. Alternatively, an exemplary process in which the image capturing operation setting is switched between two levels, namely, image capturing with a specific setting and no image capturing, according to the number of visits is also conceivable.

5. Third Example of Image Capturing Processing Operation

In the first example of the image capturing processing operation, the image capturing operation setting is switched between two levels, that is, for example, high quality and standard quality, as shown in FIG. 6. Alternatively, the setting may be switched among multiple levels.

Figure 8:
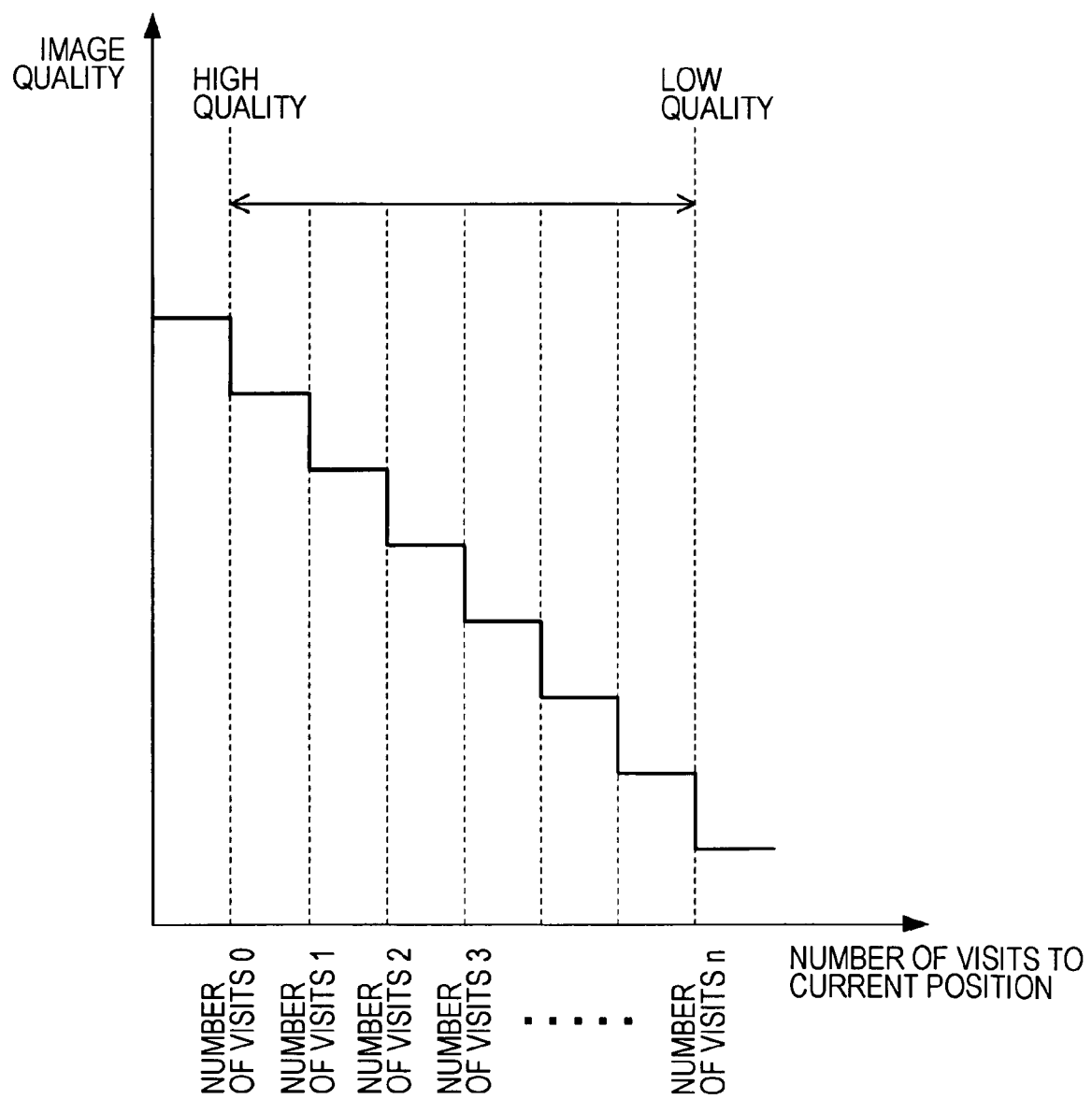
FIG. 8 is an illustration of an image capturing operation setting in the second example of the image capturing processing operation according to the embodiment.

For example, as shown in FIG. 8, the image quality is set to one of multiple levels in accordance with the number of visits. That is, when the number of visits is zero, an image with the highest quality is captured. As the number of previous visits increases, the quality of an image to be captured is reduced step by step. When the number of visits is n times or more, an image is captured with the lowest quality.

For example, an example is considered using the compression ratio. At a place where the number of previous visits is zero, captured image data is not compressed or is compressed using the lowest compression ratio and is saved. Every time the number of previous visits increases, the compression ratio is increased. When an image is captured for the n-th number of times or more, the captured image data is compressed using the highest compression ratio and is saved.

The image size can be considered in a similar manner. That is, the smaller the number of previous visits, the larger the image size (the maximum image size is used when the number of previous visits is zero). As the number of visits increases, the image size is reduced step by step.

Although the image quality is illustrated in FIG. 8, when the image capturing interval is considered, the following process is conceivable. That is, the smaller the number of previous visits, the shorter the image capturing interval. As the number of previous visits increases, the image capturing interval is extended step by step.

Figure 9:
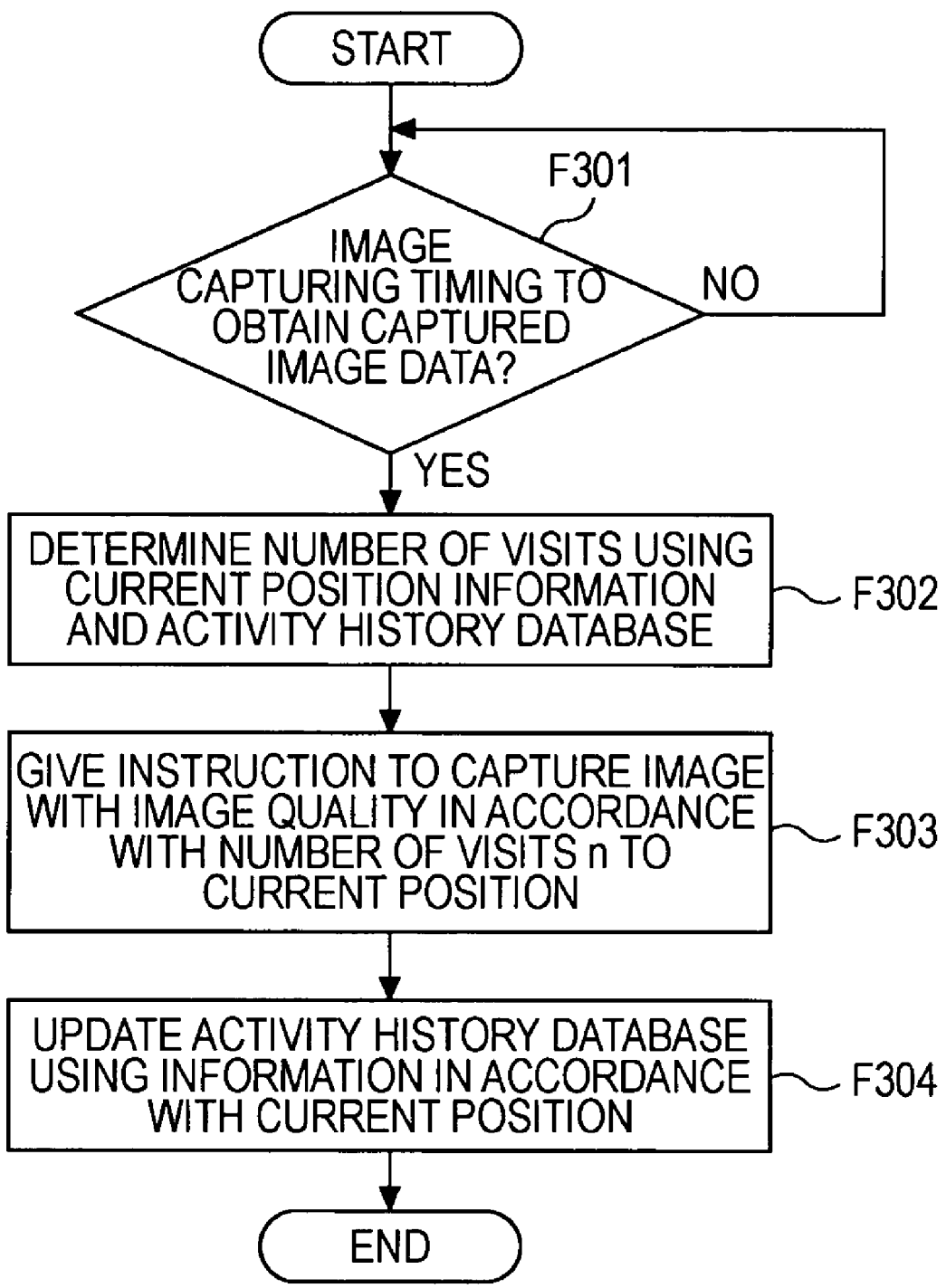
FIG. 9 is a flowchart of a third example of the image capturing processing operation according to the embodiment.

FIG. 9 illustrates an exemplary process performed by the system controller 2 in the case where the foregoing image capturing operation setting is performed.

The system controller 2 advances the process from step F301 to step F302 when the image capturing timing is reached at predetermined time intervals. As in step F102 of FIG. 5, the system controller 2 determines the number of previous visits to the place the user currently is using the current position information and the activity history database.

Next in step F303, on the basis of the number of previous visits to the current position, the system controller 2 selects, for example, one of the image quality levels set in FIG. 8, gives an instruction to compress captured image data with a compression ratio in accordance with the selected image quality, and executes an image capturing operation. Accordingly, captured image data obtained by the imaging unit 3 is compressed by the imaging controller 4 with a compression ratio in accordance with the foregoing number of visits and transferred as a still image to be saved to the storage unit 8. The storage unit 8 saves the transferred captured image data.

In step F304, the system controller 2 updates the activity history database on the basis of the current position information, as in step F106 of FIG. 5.

With the foregoing process, as a result of the automatic image capturing executed at various places, captured image data whose image quality is finely set in accordance with the number of previous visits (in accordance with the number of times the automatic image capturing has been performed in the past) can be stored.

Regarding the stepwise setting of the quality (or the setting of the image capturing interval) of captured images, the count threshold for changing the setting or the number of levels can be set to various values other than those shown in the example of FIG. 8.

6. Fourth Example of Image Capturing Processing Operation

Figure 10:
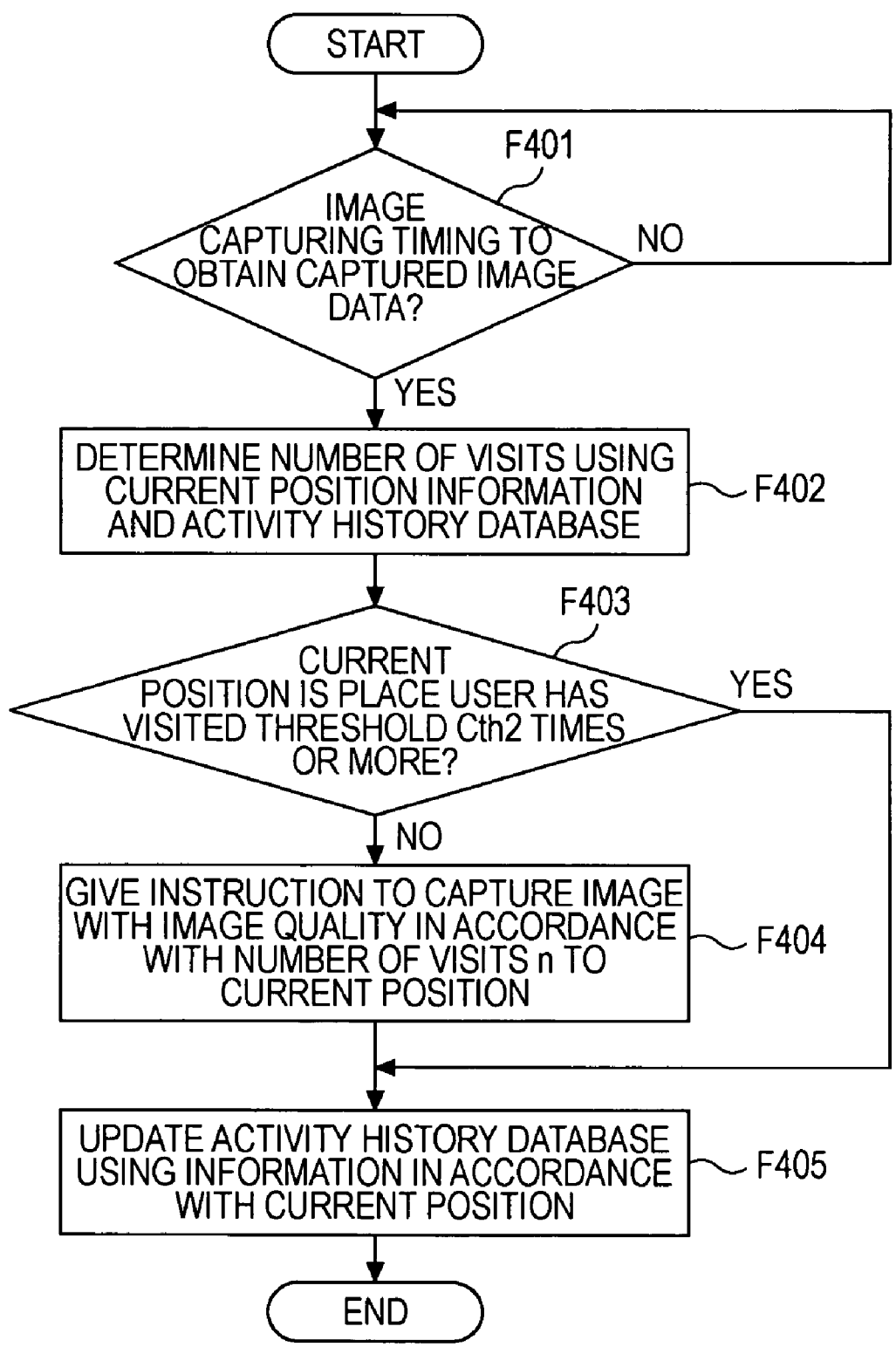
FIG. 10 is a flowchart of a fourth example of the image capturing processing operation according to the embodiment.

FIG. 10 illustrates an exemplary process performed by the system controller 2 as the fourth example of the image capturing processing operation. This is an example in which, besides changing the image capturing operation setting to multiple levels in accordance with the number of visits, as shown in FIG. 9, no image is captured at a place the user visits too frequently.

Steps F401 and F402 of FIG. 9 are the same as steps F301 and F302 of FIG. 9 described above. For example, when the image capturing timing, which is a periodical time interval, is reached, the system controller 2 determines the number of previous visits to the place the user currently is using the current position information and the activity history database.

In the case of FIG. 10, in step F403, the system controller 2 compares the number of visits to the current position, which is recognized from the activity history database, with the threshold Cth2. The threshold Cth2 is, for example, "30", based on which whether the current position is a very frequently visited place can be determined.

When the current position is a place the user has visited in the past the number of times which is greater than or equal to the threshold Cth2 and the automatic image capturing has been performed, the system controller 2 advances the process from step F403 to step S405 and updates the activity history database on the basis of the current position information. That is, the system controller 2 adds one to information indicating the number of times corresponding to the area ARx (in the case of FIG. 3A) or the position information Px (in the case of FIG. 3B) corresponding to the current position, which is registered in the activity history database.

When it is determined in step F403 that the current position is a place that has not been visited in the past the number of times which is greater than or equal to the threshold Cth2, the system controller 2 proceeds to step F404. Step F404 is the same as step F303 of FIG. 9. On the basis of the number of previous visits to the current position, the system controller 2 selects, for example, one of the image quality levels shown in FIG. 8, gives an instruction to compress captured image data with a compression ratio in accordance with the selected image quality, and executes an image capturing operation. Accordingly, captured image data obtained by the imaging unit 3 is compressed by the imaging controller 4 with a compression ratio in accordance with the foregoing number of visits and transferred as a still image to be saved to the storage unit 8. The storage unit 8 saves the transferred captured image data.

In step F405, the system controller 2 updates the activity history database on the basis of the current position information, as in step F106 of FIG. 5.

The process of FIG. 10 is repeated at predetermined time intervals. Accordingly, as a result of the automatic image capturing executed at various places, captured image data whose image quality is finely set in accordance with the number of previous visits (in accordance with the number of times the automatic image capturing has been performed in the past) can be stored. No still image is automatically captured and saved at a place the user visits too frequently.

7. Fifth Example of Image Capturing Processing Operation

In the foregoing first to fourth examples of the image capturing processing operation, the system controller 2 sets the image capturing operation setting in accordance with the current position information and the details of the activity history database (the number of visits to the current position). Further, an exemplary process of setting the image capturing operation setting to reflect the current time and date is also conceivable. In the fifth example of the image capturing processing operation, an example of setting the image capturing operation setting to reflect whether the current date is a holiday for the user is described.

Figure 11:
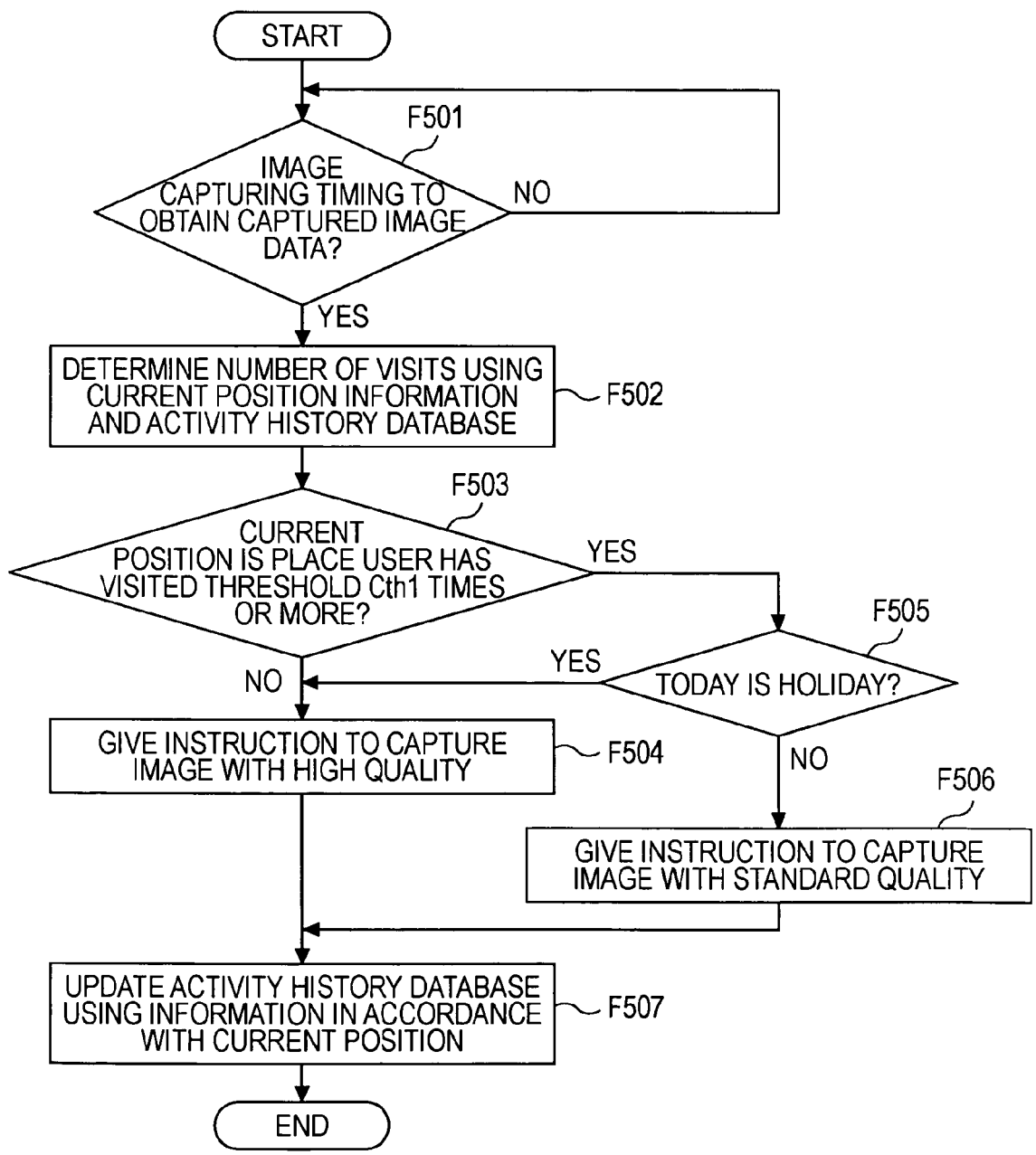
FIG. 11 is a flowchart of a fifth example of the image capturing processing operation according to the embodiment.

FIG. 11 illustrates an exemplary process performed by the system controller 2.

Steps F501 and F502 are the same as steps F101 and F102 of FIG. 5 described above. For example, when the image capturing timing, which is a periodical time interval, is reached, the system controller 2 determines the number of previous visits to the place the user currently is using the current position information and the activity history database.

In step F503, the process is branched into two steps depending on whether the current position is a place the user has previously visited the number of times which is greater than or equal to Cth1.

When the number of previous visits to the place the user currently is (the number of times the automatic image capturing has been performed in the past) is less than the threshold Cth1 and it is thus determined that the current position is a place the user visits not so frequently, the system controller 2 proceeds to step F504 and gives an instruction to capture an image with the high quality, which serves as the dominant setting. Accordingly, the imaging controller 4 compresses captured image data obtained by the imaging unit 3 using a low compression ratio serving as the non-dominant setting and transfers the captured image data as a still image to be saved to the storage unit 8. The storage unit 8 saves the transferred captured image data.

In contrast, when the number of previous visits to the place the user currently is greater than or equal to the threshold Cth1 and it is thus determined that the current position is a place the user frequently visits, the system controller 2 proceeds to step F505 and determines whether the current date (today) is a holiday for the user.

In this case, the system controller 2 detects the today's date on the basis of information from the time-and-date counting unit 11 and determines whether today is a holiday for the user by referring to calendar information stored in the calendar-information recording portion 8d. As has been described above, since the calendar information is information indicating the user's holidays in accordance with user input, whether today is a holiday for the user can be determined by referring to the calendar information.

When it is determined in step F505 that today is not a holiday, the system controller 2 proceeds to step F506 and gives an instruction to capture an image with the standard quality serving as the non-dominant setting. Accordingly, the imaging controller 4 compresses captured image data obtained by the imaging unit 3 using a high compression ratio serving as the non-dominant setting and transfers the captured image data as a still image to be saved to the storage unit 8. The storage unit 8 saves the transferred captured image data.

In contrast, when it is determined in step F505 that today is a holiday, the system controller 2 proceeds to step F504 and gives an instruction to capture an image with the high quality serving as the dominant setting. Accordingly, even when the current position is a frequently visited place, if the current date is a holiday, captured image data is saved as a high-quality image.

After performing the processing in step F504 or F506, the system controller 2 updates in step F507 the activity history database in accordance with the current position, as in step F106 of FIG. 5, and the process ends.

With this exemplary process, the following operation is executed on the imaging apparatus 1.

At a not so frequently visited place, an image is captured (saved) with the dominant setting.

At a frequently visited place, when the current date is not a holiday, an image is captured (saved) with the non-dominant setting.

Even at a frequently visited, when the current date is a holiday, an image is captured (saved) with the dominant setting.

That is, even at a similar place, the user on a holiday often performs activities different from those performed on weekdays. Accordingly, a captured image is regarded as often being valuable to the user. Therefore, capturing an image with the dominant setting is suitable as a lifelog image capturing operation.

In this exemplary process, different image capturing operation settings are set depending on whether today is a holiday or a weekday. Alternatively, different image capturing operation settings can be set depending on the time or hours.

For example, even on weekdays, on evenings after the user finishes his or her work, it is conceivable that the user freely performs various activities.

Accordingly, an exemplary process of capturing, on a weekday, even at a frequently visited place, images with the dominant setting at specific hours, such as from 6 PM to 0 AM, is conceivable.

The activity pattern in everyday life is greatly different from one user to another. For example, working hours or school hours are different for each individual. Some people go straight home on weekdays. Others often do not go home right away. Therefore, each user enters and registers in advance the hours at which the user often performs free activities or the hours at which the user often goes out. An exemplary process of comparing, using the system controller 2, the current time with the registered hours and, when the current time is within the registered hours, capturing an image with the dominant setting is also conceivable. Conversely, an exemplary process of executing an image capturing operation with the non-dominant setting at the registered hours is also conceivable.

8. Sixth Example of Image Capturing Processing Operation

Figure 12:
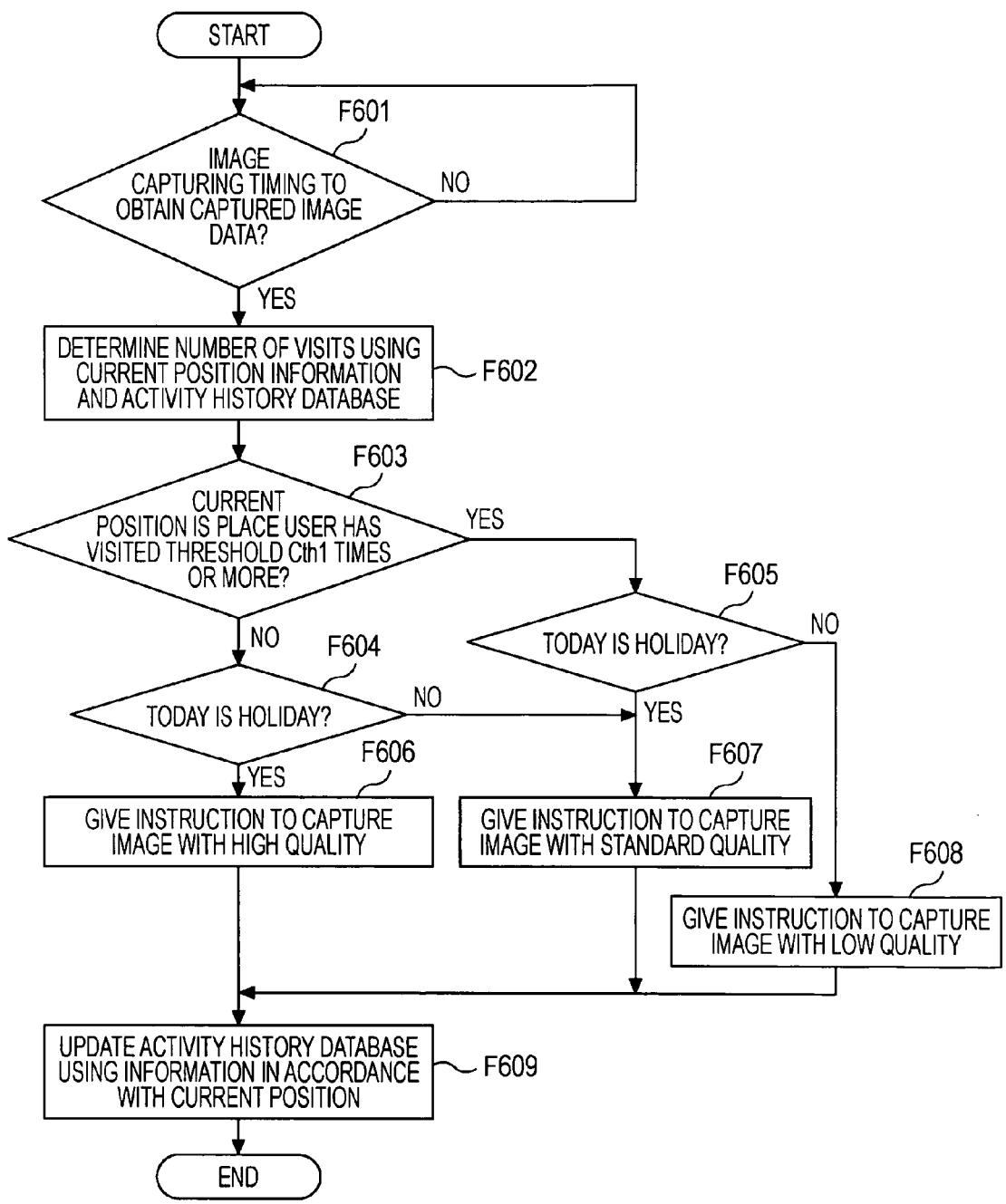
FIG. 12 is a flowchart of a sixth example of the image capturing processing operation according to the embodiment.

FIG. 12 illustrates the sixth example of the image capturing processing operation. This is the example in which the image capturing operation setting is switched depending on whether today is a weekday or a holiday, as shown in FIG. 11. Further in this example, the image capturing operation setting is switched among multiple levels (three levels in this example).

Steps F601, F602, and F603 are the same as steps F501, F502, and F503 of FIG. 11 described above.

In the case of FIG. 12, when the system controller 2 determines in step F603 that the number of previous visits to the place the user currently is (the number of times the automatic image capturing has been performed in the past) is less than the threshold Cth1 and it is thus determined that the current position is a not so frequently visited place, the system controller 2 proceeds to step F604 and determines whether today is a holiday for the user on the basis of the current date and calendar information.

When it is determined in step F603 that the number of previous visits to the place the user currently is greater than or equal to the threshold Cth1 and it is thus determined that the current position is a frequently visited place, the system controller 2 proceeds to step F605 and determines whether today is a holiday for the user on the basis of the current date and calendar information.

When it is determined in step F604 that today is a holiday, the system controller 2 proceeds to step F606 and gives an instruction to capture a high-quality image. Accordingly, the imaging controller 4 compresses captured image data obtained by the imaging unit 3 using a low compression ratio and transfers the captured image data as a still image to be saved to the storage unit 8. The storage unit 8 saves the transferred captured image data.

When it is determined in step F604 that today is not a holiday or when it is determined in step F605 that today is a holiday, the system controller 2 proceeds to step F607 and gives an instruction to capture an image with the standard quality serving as an intermediate setting. Accordingly, the imaging controller 4 compresses captured image data obtained by the imaging unit 3 using a standard compression ratio and transfers the captured image data as a still image to be saved to the storage unit 8. The storage unit 8 saves the transferred captured image data.

When it is determined in step F605 that today is not a holiday, the system controller 2 proceeds to step F608 and gives an instruction to capture an image with a low quality setting. Accordingly, the imaging controller 4 compresses captured image data obtained by the imaging unit 3 using a compression ratio higher than the above-described standard compression ratio and transfers the captured image data as a still image to be saved to the storage unit 8. The storage unit 8 saves the transferred captured image data.

After performing the processing in step F606, F607, or F608, the system controller 2 updates in step F609 the activity history database in accordance with the current position, as in step F106 of FIG. 5, and the process ends.

With this exemplary process, the following operation is executed on the imaging apparatus 1.

At a not so frequently visited place, on a holiday, an image is captured (saved) with the highest quality setting.

Even at a not so frequently visited place, when the current date is not a holiday, an image is captured (saved) with the intermediate quality setting.

Even at a frequently visited place, on a holiday, an image is captured (saved) with the intermediate quality setting.

At a frequently visited place, when the current date is not a holiday, an image is captured (saved) with the low quality setting.

In this manner, in addition to the condition whether the current position is a frequently visited place, the image capturing operation setting is switched among three levels under the condition whether today is a holiday for the user. Accordingly, an operation suitable as a lifelog image capturing operation is executed.

Here, the setting is switched among three levels. Alternatively, the setting can be switched among four levels so that different settings are employed in the foregoing four states.

In the exemplary process of FIG. 12, different image capturing operation settings are employed depending on whether today is a holiday or a weekday. As has been additionally explained in the description of FIG. 11, different image capturing operation settings may be employed according to the time or hours. That is, whether the current time is within specific hours is determined in steps F604 and F605.

9. Seventh Example of Image Capturing Processing Operation

Figure 14:
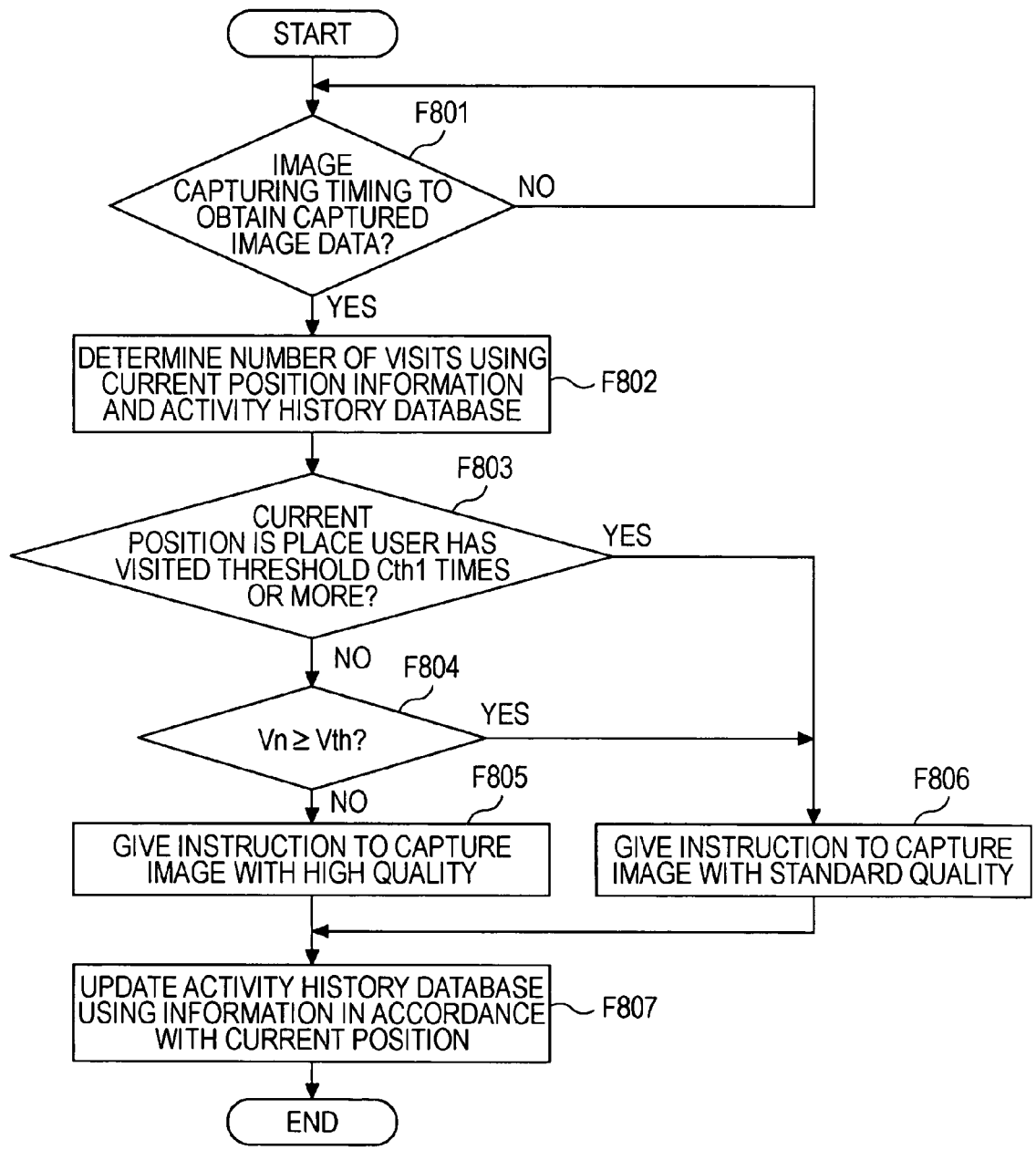
FIG. 14 is a flowchart of the seventh example of the image capturing processing operation according to the embodiment.

The seventh example of the image capturing processing operation is described using FIGS. 13 and 14.

The seventh example of the image capturing processing operation is an example in which the image capturing operation setting is set to reflect the moving velocity of the user wearing the imaging apparatus 1.

In everyday life, the user may be still at a certain place, walking or running in a certain section, or traveling by car, train, bus, or bicycle. In view of the moving velocity, various states are conceivable.

As image capturing operation settings for capturing images with different quality levels, various settings are conceivable with regard to in which state the image quality is set to high or the image capturing interval is changed. For example, when the user is moving relatively fast, scenes around the user are only pass points so that the user pays little attention to them. These scenes are rarely remembered by the user, and the user is not very interested in captured images of these scenes. Therefore, it is only necessary that these images have low quality regarding the compression ratio or the image size.

When the user is moving relatively fast, conversely, scenes to which the user pays little attention may be regarded as scenes that the user wants to have a good look at a later time. Therefore, images captured when the user is moving at a fast moving velocity should have a high quality.

When the user is moving relatively fast, scenes seen by the user change greatly. Therefore, shortening the image capturing interval can be considered preferable.

Conversely, when the user is traveling by train or bus, similar scenes inside the train or bus are captured. It may thus be preferable to extend the image capturing interval.

That is, when the image capturing operation setting is set to reflect the moving velocity, in which of a fast moving velocity and a slow moving velocity the dominant setting regarding the image quality or the image capturing interval is set can vary depending on the actual application or the user's intention. Here, one example is given to illustrate an exemplary process of setting the image capturing operation setting to reflect the user's moving velocity.

In order to determine the user's moving velocity (moving velocity of the imaging apparatus 1 itself), the system controller 2 constantly executes, for example, a process shown in FIG. 13.

In step F701, the system controller 2 stores position information obtained by the position detector 10 as the current position Pn. The system controller 2 stores the current time and date information (e.g., seconds, minutes, hours, days, months, and years), which is obtained by the time-and-date counting unit 11, as the current time Tn.

When the process shown in FIG. 13 starts and proceeds to step F702, the flow proceeds to step F704 and then to step F705 and substitutes the current position Pn for a variable Pp serving as the immediately preceding position and the current time Tn for a variable Tp serving as the immediately preceding time.

The flow returns to step F701, and the system controller 2 stores position information obtained by the position detector 10 as the current position Pn and the current time and date information obtained by the time-and-date counting unit 11 as the current time Tn.

After the processing in step F701 is performed for the second time, the system controller 2 advances the process from step F702 to step F703 and calculates the current velocity Vn.

That is, the moving distance is calculated from the difference between the current position Pn and the immediately preceding position Pp. The moving time is calculated from the difference between the current time Tn and the immediately preceding time Tp. The moving distance is divided by the moving time to obtain the current velocity Vn.

The flow proceeds from step F704 to step F705. The current position Pn is substituted for the immediately preceding position Pp, and the current time Tn is substituted for the immediately preceding time Tp. The flow returns to step F701.

Thereafter, until the velocity detecting operation is terminated in step F704 due to power off or termination of the automatic image capturing operation, the flow in the order of steps F701, F702, F703, F704, F705, F701, . . . is repeated.

Accordingly, the velocity Vn calculated in step F703 can be constantly detected as the current velocity.

In this example, the system controller 2 performs the process shown in FIG. 13 to constantly detect the current velocity Vn. Alternatively, for example, in the structure shown in FIG. 2, a velocity detector for performing a process such as that in FIG. 13 may be provided besides the system controller 2. The velocity detector may supply the current velocity information Vn to the system controller 2.

The system controller 2 performs the process shown in FIG. 14 as a process of setting the image capturing operation setting.

As steps F801 and F802 of FIG. 14, as in steps F101 and F102 of FIG. 5 described above, for example, when the image capturing timing, which is a periodical time interval, is reached, the system controller 2 determines the number of previous visits to the place the user currently is using the current position information and the activity history database.

In step F803, the process is branched into two steps depending on whether the current position is a place the user has previously visited the number of times which is greater than or equal to Cth1.

When the number of previous visits to the place the user currently is (the number of times the automatic image capturing has been performed in the past) is greater than or equal to the threshold Cth1 and it is thus determined that the current position is a place the user frequently visits, the system controller 2 proceeds to step F806 and gives an instruction to capture an image with the standard quality, which serves as the non-dominant setting. Accordingly, the imaging controller 4 compresses captured image data obtained by the imaging unit 3 using a high compression ratio serving as the non-dominant setting and transfers the captured image data as a still image to be saved to the storage unit 8. The storage unit 8 saves the transferred captured image data.

In contrast, when the number of previous visits to the place the user currently is (the number of times the automatic image capturing has been performed in the past) is less than the threshold Cth1 and it is thus determined that the current position is a place the user visits not so frequently, the system controller 2 proceeds to step F804, checks the current velocity Vn, and determines whether the velocity Vn is greater than or equal to a predetermined comparison reference velocity Vth.

That is, the system controller 2 performs the foregoing process shown in FIG. 13 in parallel. At the time in step F804, the system controller 2 checks the velocity Vn stored in step F703 of FIG. 13, that is, the current velocity. The system controller 2 compares the velocity Vn with the predetermined comparison reference velocity Vth.

When the current velocity Vth is faster than or equal to the comparison reference velocity Vth, the flow proceeds to step F806, and the system controller 2 gives an instruction to capture an image with the standard quality. Accordingly, captured image data with the standard quality, which serves as the non-dominant setting, is saved.

When the current velocity Vn is slower than the comparison reference velocity Vth, the flow proceeds to step F805, and the system controller 2 gives an instruction to capture an image with the high quality, which serves as the dominant setting. Accordingly, the imaging controller 4 compresses captured image data obtained by the imaging unit 3 using a low compression ratio serving as the dominant setting and transfers the captured image data as a still image to be saved to the storage unit 8. The storage unit 8 saves the transferred captured image data.

After performing the processing in step F805 or F806, the system controller 2 updates in step F807 the activity history database in accordance with the current position, as in step F106 of FIG. 5, and the process ends.

With the process shown in FIG. 14, the following operation is executed.

At a frequently visited place, an image is captured (saved) with the non-dominant setting.

Even at a not so frequently visited place, when the moving velocity is relatively fast (such as when it is estimated that the user is traveling by a vehicle), an image is captured (saved) with the non-dominant setting.

At a not so frequently visited place, when the moving velocity is relatively slow (such as when the user is estimated to be still or walking), an image is captured (saved) with the dominant setting.

That is, the image capturing operation setting is basically switched between the dominant setting and the non-dominant setting according to the number of visits. Even at a not so frequently visited place, when the user is estimated to be, for example, traveling by a vehicle, scenes at that time are regarded as becoming not so valuable images. Accordingly, an image is captured (saved) with the non-dominant setting.

Various exemplary processes are conceivable. For example, when it is determined in step F804 that the velocity is fast, the flow may proceed to step F805, and the dominant setting may be set.

When the current position is a frequently visited place, the image capturing operation setting may be switched according to the current velocity.

Distinctions are made among four states including a state in which the user is at a frequently visited place and is moving at a high velocity, a state in which the user is at a frequently visited place and is moving at a low velocity or is still, a state in which the user is at a not so frequently visited place and is moving at a high velocity, and a state in which the user is at a not so frequently visited place and is moving at a low velocity or still. In the individual states, the image capturing operation setting may be switched among four levels. Alternatively, the user may be allowed to select whether to set similar image capturing operation settings in the individual four states.

In FIG. 14, changing the image quality setting is illustrated. In particular, the moving velocity can be reflected suitably by changing the image capturing interval.

In that case, taking into consideration that scenes change greatly due to the high-velocity movement, the image capturing setting of shortening the image capturing interval, which serves as the dominant setting, when the user is at a not so frequently visited place and is moving at a high velocity is conceivable.

Conversely, when the user is moving at a high velocity, the user may be moving to a destination or the like and most of the scenes on the way are regarded as not so memorable. Even at a not so frequently visited place, when the user is moving at a high velocity, the image capturing operation setting of extending the image capturing interval, which serves as the non-dominant setting, is also conceivable.

Here, the setting is switched between two levels, the dominant setting and the non-dominant setting. Alternatively, the setting can be switched among multiple levels according to the velocity.

10. Eighth Example of Image Capturing Processing Operation

When the image capturing operation setting is set to reflect the current velocity, as has been described above, which of high and low velocities corresponds to the dominant setting or the non-dominant setting can vary. When the user is moving at a high velocity, the user can be moving at a high velocity in various states. For example, the user may be traveling by train, car, or bicycle, or the user may be running.

Here, an exemplary process assuming the state in which the user is traveling by public transportation, such as a train or bus, is described.

For example, when the position detector 10 detects position information, it can be determined whether the user's current position is on a route of a train or bus by referring to the map database. In that case, for example, when the current velocity Vn is detected using the process shown in FIG. 13, it can be estimated whether the user is traveling using transportation.

Figure 15:
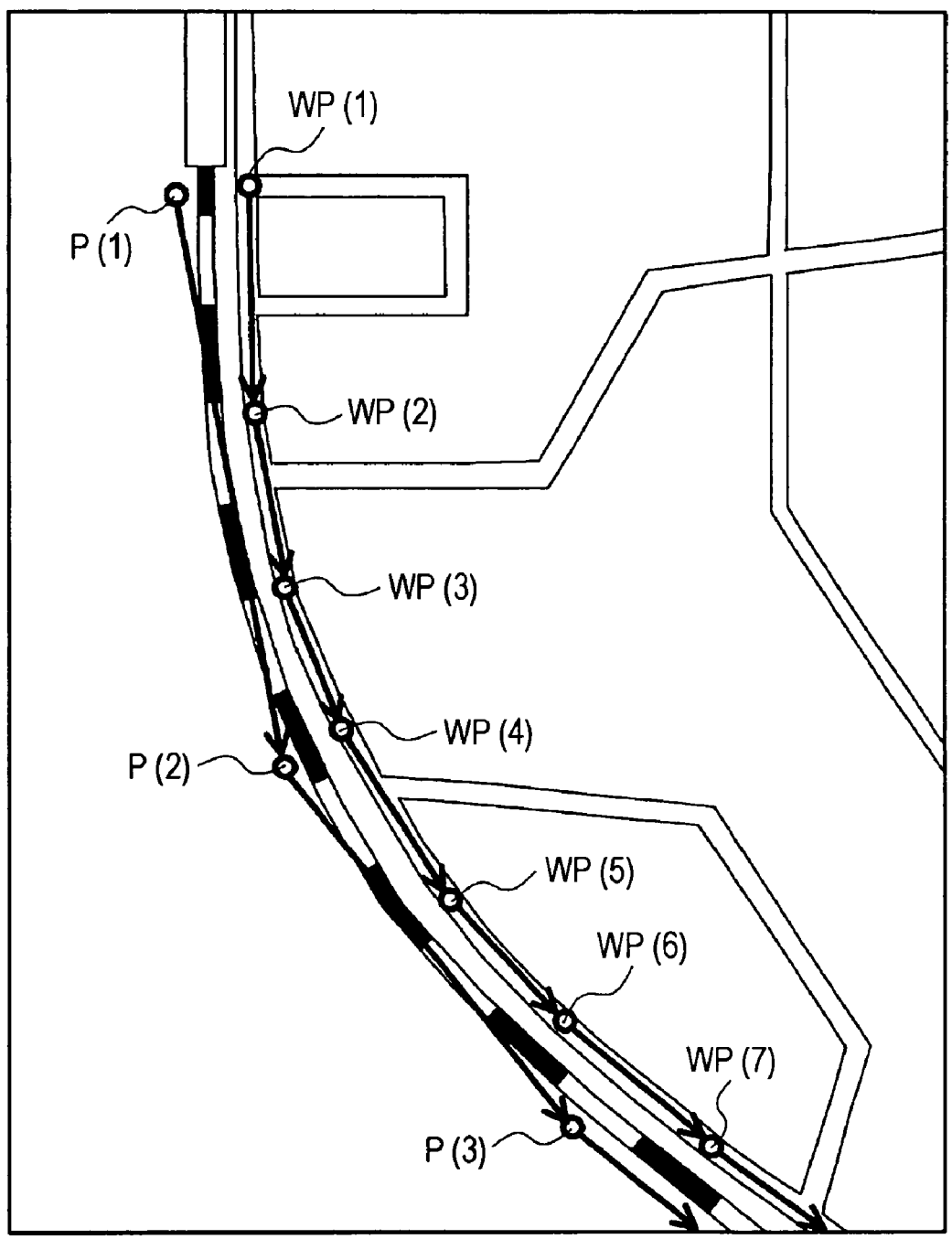
FIG. 15 is an illustration of the eighth example of the image capturing processing operation according to the embodiment.

For example, states shown in FIG. 15 are considered. FIG. 15 illustrates, for example, the position of the user at each image capturing timing at which an image is automatically captured. Positions P(1), P(2), and P(3) are regarded as position information detected at individual image capturing timings when the user is traveling by train.

In contrast, positions WP(1), WP(2), . . . WP(7) are regarded as position information detected at individual image capturing timings when the user is walking along the rails of the train.

For example, it is difficult to determine whether the user is traveling by train or walking along the train only using position detection. However, when the velocity Vn is detected as has been described in FIG. 13, whether the user is traveling by train or walking along the train can be determined.

When the user is walking, basically, the image capturing operation setting may be switched depending on whether the current position is a frequently visited place or not.

When the user is traveling by train, captured images are highly likely to be similar images captured inside the train. Therefore, even at a not so frequently visited place, it can be regarded that it is unnecessary to set the image capturing operation setting to the dominant setting.

Figure 16:
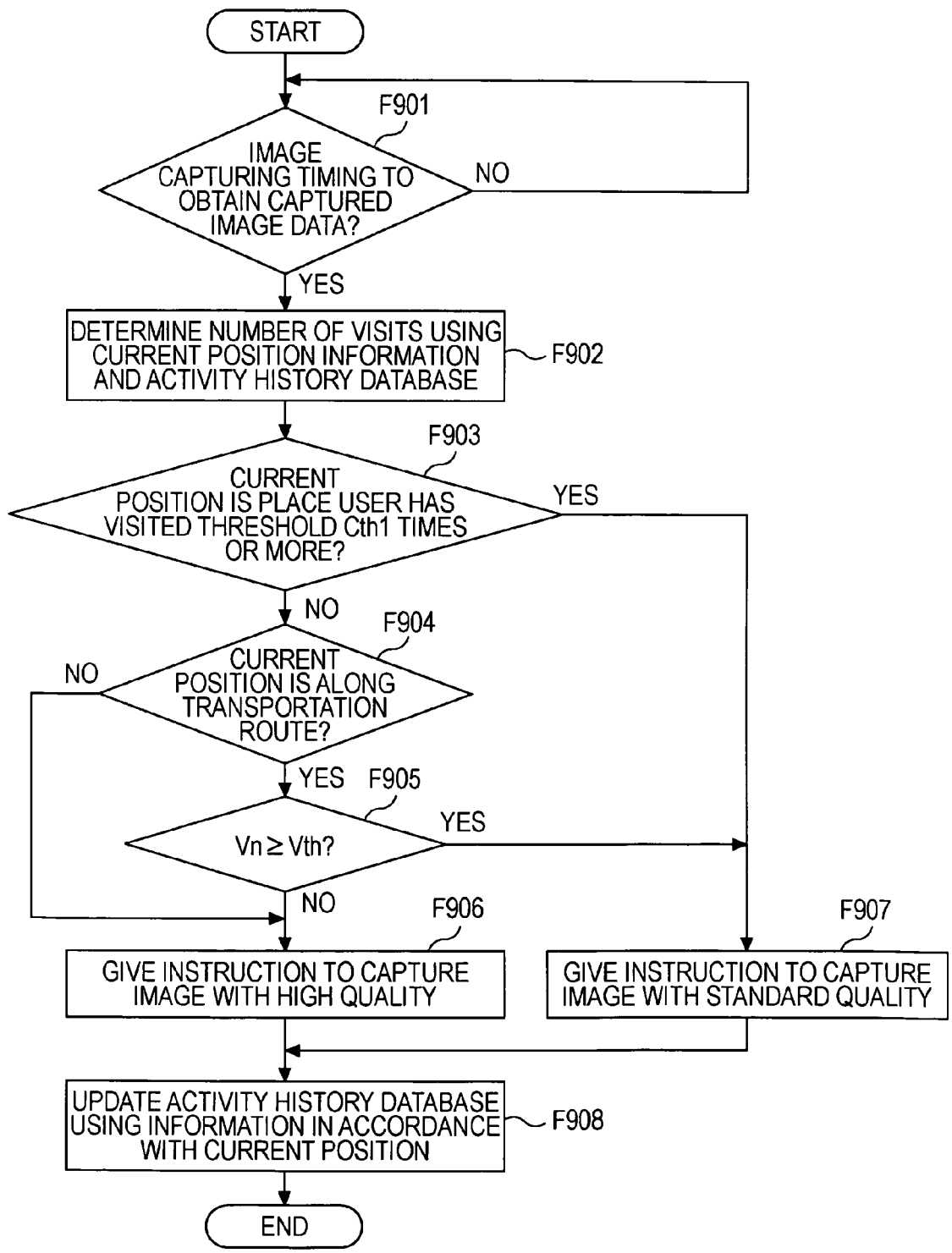
FIG. 16 is a flowchart of the eighth example of the image capturing processing operation according to the embodiment.

FIG. 16 illustrates an exemplary process performed by the system controller 2 based on the foregoing idea. In this case, it is assumed that the system controller 2 performs the velocity detecting process shown in FIG. 13 in parallel.

As steps F901 and F902 of FIG. 16, as in steps F101 and F102 of FIG. 5 described above, for example, when the image capturing timing, which is a periodical time interval, is reached, the system controller 2 determines the number of previous visits to the place the user currently is using the current position information and the activity history database.

In step F903, the process is branched into two steps depending on whether the current position is a place the user has previously visited the number of times which is greater than or equal to Cth1.

When the number of previous visits to the place the user currently is (the number of times the automatic image capturing has been performed in the past) is greater than or equal to the threshold Cth1 and it is thus determined that the current position is a place the user frequently visits, the system controller 2 proceeds to step F907 and gives an instruction to capture an image with the standard quality, which serves as the non-dominant setting. Accordingly, the imaging controller 4 compresses captured image data obtained by the imaging unit 3 using a high compression ratio serving as the non-dominant setting and transfers the captured image data as a still image to be saved to the storage unit 8. The storage unit 8 saves the transferred captured image data.

In contrast, when the number of previous visits to the place the user currently is (the number of times the automatic image capturing has been performed in the past) is less than the threshold Cth1 and it is thus determined that the current position is a place the user visits not so frequently, the system controller 2 proceeds to step F904 and determines whether the current position is a position along a transportation route. That is, the system controller 2 refers to the map database on the basis of the current position information and determines whether the current position is a position on a train or bus route.

When the current position is not on a transportation route, the flow proceeds to step F906, and the system controller 2 gives an instruction to capture an image with the high quality, which serves as the dominant setting. Accordingly, the imaging controller 4 compresses captured image data obtained by the imaging unit 3 using a low compression ratio serving as the dominant setting and transfers the captured image data as a still image to be saved to the storage unit 8. The storage unit 8 saves the transferred captured image data.

When it is determined in step F904 that the current position is along a transportation route, in step F905, the system controller 2 checks the current velocity Vn and determines whether the velocity Vn is greater than or equal to the predetermined comparison reference velocity Vth.

That is, since the system controller 2 performs the process shown in FIG. 13 in parallel, the system controller 2 checks the velocity Vn stored at the current point in step F703 of FIG. 13, that is, the current velocity. The system controller 2 compares the velocity Vn with the predetermined comparison reference velocity Vth. In this case, the comparison reference velocity may be a velocity based on which a distinction can be made between the moving velocity of a train or bus and the moving velocity of a person. For example, the comparison reference velocity is a value of about 20 to 30 km/h.

When the current velocity Vth is faster than or equal to the comparison reference velocity Vth, it is estimated that the user is traveling by train or bus. The flow proceeds to step F907, and the system controller 2 gives an instruction to capture an image with the standard quality. Accordingly, captured image data with the standard quality, which serves as the non-dominant setting, is saved.

When the current velocity Vn is slower than the comparison reference velocity Vth, it is estimated that the user is walking or the like. The flow proceeds to step F906, and the system controller 2 gives an instruction to capture an image with the high quality, which serves as the dominant setting. Accordingly, captured image data with the high quality, which serves as the dominant setting, is saved.

After performing the processing in step F906 or F907, the system controller 2 updates in step F908 the activity history database in accordance with the current position, as in step F106 of FIG. 5, and the process ends.

With the process shown in FIG. 14, the following operation is executed.

At a frequently visited place, an image is captured (saved) with the non-dominant setting.

Even at a not so frequently visited place, when the user is on a transportation route and the moving velocity is relatively fast, it is estimated that the user is traveling by train or bus. Accordingly, an image is captured (saved) with the non-dominant setting.

At a not so frequently visited place, when the user is not on a transportation route or, even when the user is on a transportation route, when the moving velocity is relatively slow, an image is captured (saved) with the dominant setting.

That is, the image capturing operation setting is basically switched between the dominant setting and the non-dominant setting according to the number of visits. Even at a not so frequently visited place, when the user is estimated to be, for example, traveling by train or bus, scenes at that time are regarded as becoming not so valuable images. Accordingly, an image is captured (saved) with the non-dominant setting.

Although the example in which the image quality (compression ratio) of captured image data is switched in steps F906 and F907 has been described, the image size setting may be switched. Alternatively, in steps F906 and F907, the image capturing interval for the next and subsequent automatic image capturing operations may be switched. For example, in step F906, the image capturing interval is set to be shortened. In step F907, the standard image capturing interval is set.

When the user is traveling by train or bus, scenes inside the train or bus are regarded as becoming not so valuable images, and hence, the non-dominant setting is set. However, even when the user is traveling by train or bus, if the user is capturing an image of scenery seen from a window of the train or bus, the image is regarded to be relatively valuable to the user.

In that sense, the dominant setting may be set when the user is traveling by train or bus.

Alternatively, whether the imaging apparatus 1 is capturing an image of the scene inside the train or bus or the scenery seen from a window of the train or bus may be automatically determined. For example, in the process shown in FIG. 16, when the velocity is fast in step F905 and it is thus determined that the user is traveling by train or the like, it is then determined whether the subject of an image is the scene inside the train or the scenery seen from a window of the train or bus. For example, the luminance levels of frames of captured image data obtained by the imaging unit 3 are compared with one another to determine whether the details of images in the frames greatly change. As a result, whether the captured image data is an image of the scene inside the train or an image of the scenery seen from a window of the train or bus can be determined. Alternatively, whether the captured image data is an image of the scene inside the train or an image of the scenery seen from a window of the train or bus can be estimated simply by comparing the luminance level with a predetermined threshold.

With such an estimation, when it is determined that an image of the scenery seen from a window of the train or bus is captured, the flow proceeds to step F906, and the high image quality setting, which serves as the dominant setting, may be set, or the setting may be set to shorten the image capturing interval.

11. Advantages and Modifications of Embodiment

According to the above-described embodiment, a control operation is performed to adaptively switch the image capturing operation setting in the automatic image capturing operation according to the user's activities.

For example, when images are automatically captured at, for example, periodical intervals, the image quality (compression ratio) or the image size is switched or the image capturing interval is changed in accordance with whether the current position is a place the user frequently visits. Accordingly, in automatic image capturing, captured image data can be appropriately obtained in accordance with the user's activities, and images can be saved.

In particular, when the user is at a not so frequently visited place, image data of high quality is captured, or the image capturing interval is shortened. Accordingly, many items of captured image data which are valuable to the user, such as images of scenes the user rarely sees in everyday life, are saved with the high quality.

In contrast, when the user is at a frequently visited place, captured images are not so valuable to the user. In that case, image data of low quality is captured, or the image capturing interval is extended. Accordingly, images are appropriately saved so as not to consume the recording capacity in a useless manner.

At the time of automatic image capturing, automatic image capturing appropriate for the user is performed by switching the image quality or the image capturing interval depending on, besides the current position, whether the current date is a holiday or whether the current time is within specific hours.

Further, automatic image capturing appropriate for the user is performed by detecting the moving velocity and switching the image quality or the image capturing interval.

Accordingly, an operation of automatically capturing images to keep a lifelog becomes an appropriate operation that suits the user's activities and the like.

Although the embodiment of the present invention has been described above, the present invention is not limited thereto, and various modifications are conceivable.

Although the foregoing examples have been described in view of capturing still images, the present invention is applicable to an imaging apparatus that captures a moving image.

For example, an imaging apparatus that constantly and continuously captures a moving image is considered. Settings for the frame rate, image size, and compression ratio can be successively changed in accordance with whether the current position is a frequently visited place. For example, at a not so frequently visited place, a moving image is captured with a high frame rate and a low compression ratio, which serve as dominant settings. At a frequently visited place, the settings are switched to capture a moving image with a low frame rate and a high compression ratio.

When capturing a moving image, a moving image can be constantly and continuously captured. Alternatively, for example, an operation method in which a moving image is intermittently captured for a certain period of time is also conceivable. In such a case, the frame rate, image size, compression ratio, and/or image capturing interval can be switched depending on whether the current position is a frequently visited place.

When capturing a moving image, besides changing the setting according to the current position, the image capturing operation setting may be set to reflect time-and-date information and velocity information, as has been described in the embodiment.

Further, capturing a moving image may serve as the dominant setting over capturing a still image. Image capturing can be switched between capturing a still image and capturing a moving image.

For example, in an exemplary operation, a still image is captured at a frequently visited place, and a moving image is continuously or intermittently captured at a not so frequently visited place, which serves as the dominant setting.

Setting conditions described in the foregoing embodiment can be combined in various manners, regardless of whether a still image or a moving image is captured.

For example, the condition whether the current position is a frequently visited place, the condition whether the current date is a holiday (or the current time is within specific hours), and the condition whether the current velocity is greater than or equal to a predetermined velocity are combined, and the image capturing operation setting may be switched between two levels or among three or more levels.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   imaging means for performing, as an image capturing operation, a process of obtaining captured image data of a subject and saving the captured image data;
   position detecting means for detecting current position information; and
   control means for updating activity history information on the basis of the position information obtained by the position detecting means and, when performing image capturing control as an automatic image capturing process not based on a shutter operation performed by a user, setting an image capturing operation setting on the basis of the current position information detected by the position detecting means and the activity history information, and causing the imaging means to perform an image capturing operation based on the image capturing operation setting;
   wherein, when a place determined from the current position information detected by the position detecting means is determined to be a place that has not been previously visited a predetermined number of times or more, the control means sets a dominant setting as the image capturing operation setting, and, when the place determined from the current position information detected by the position detecting means is determined to be a place that has been previously visited the predetermined number of times or more, the control means sets a non-dominant setting as the image capturing operation setting.

2. The imaging apparatus according to claim 1, wherein the control means determines a number of previous visits to a place determined from the current position information detected by the position detecting means by referring to activity history information and sets the image capturing operation setting on the basis of the number.

3. The imaging apparatus according to claim 1, wherein the control means sets, as the image capturing operation setting, an image quality setting, an image size setting, an image capturing time interval setting, a frame rate setting, or a setting not to capture an image.

4. The imaging apparatus according to claim 1, wherein the dominant setting is one of a first image quality setting that sets a higher image quality than an image quality set by a second image quality setting serving as a non-dominant setting, a first image size setting that sets a larger size than an image size set by a second image size setting serving as the non-dominant setting, a first image capturing time interval setting that sets a shorter image capturing time interval than the image capturing time interval set by a second image capturing time interval setting serving as the non-dominant setting, and a first frame rate setting that sets a higher frame rate than a frame rate set by a second frame rate setting serving as the non-dominant setting.

5. The imaging apparatus according to claim 1, further comprising time-and-date counting means for counting time-and-date information,
  wherein the control means sets the image capturing operation setting on the basis of the current position information detected by the position detecting means, the activity history information, and the current time-and-date information counted by the time-and-date counting means.

6. The imaging apparatus according to claim 5, further comprising storage means for storing calendar information indicating holiday information of the user,
  wherein the control means determines, using the current time-and-date information counted by the time-and-date counting means and the calendar information, a result indicating whether the current date is a holiday for the user and sets the image capturing operation setting to reflect the result.

7. An imaging apparatus comprising:
  imaging means for performing, as an image capturing operation, a process of obtaining captured image data of a subject and saving the captured image data;
  position detecting means for detecting current position information; and
  control means for updating activity history information on the basis of the position information obtained by the position detecting means and, when performing image capturing control as an automatic image capturing process not based on a shutter operation performed by a user, setting an image capturing operation setting on the basis of the current position information detected by the position detecting means and the activity history information, and causing the imaging means to perform an image capturing operation based on the image capturing operation setting;
  further comprising velocity detecting means for detecting a moving velocity,
  wherein the control means sets the image capturing operation setting on the basis of the current position information detected by the position detecting means, the activity history information, and the moving velocity detected by the velocity detecting means;
  further comprising storage means for storing map information,
  wherein, when it is determined that the current position is on a transportation route on the basis of the current position information detected by the position detecting means and the map information, the control means sets the image capturing operation setting to reflect the moving velocity detected by the velocity detecting means.

* * * * *